US007523222B2

(12) United States Patent
Carlson et al.

(10) Patent No.: US 7,523,222 B2
(45) Date of Patent: *Apr. 21, 2009

(54) METHOD FOR AUTOMATICALLY IMPLEMENTING SPECIAL FORMS IN AN E-MAIL SYSTEM

(75) Inventors: Andrew G. Carlson, Redmond, WA (US); Nicholas Paul Duane, Bothell, WA (US); Scott A. Thurlow, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 111 days.

This patent is subject to a terminal disclaimer.

(21) Appl. No.: 11/299,805

(22) Filed: Dec. 12, 2005

(65) Prior Publication Data

US 2006/0168067 A1 Jul. 27, 2006

Related U.S. Application Data

(60) Continuation of application No. 10/084,589, filed on Feb. 27, 2002, now Pat. No. 7,010,616, which is a continuation of application No. 09/019,246, filed on Feb. 5, 1998, now abandoned, which is a division of application No. 08/658,840, filed on May 31, 1996, now Pat. No. 5,923,848.

(51) Int. Cl.
*G06F 15/16* (2006.01)
*G06F 17/00* (2006.01)
(52) U.S. Cl. .................... 709/246; 709/201; 715/222
(58) Field of Classification Search .......... 709/201, 709/203, 206, 217, 246; 715/505, 506, 507, 715/744, 809, 222
See application file for complete search history.

(56) References Cited

U.S. PATENT DOCUMENTS

| 4,803,619 | A | | 2/1989 | Bernstein et al. ............ 364/200 |
|---|---|---|---|---|
| 5,119,476 | A | * | 6/1992 | Texier ........................ 715/809 |
| 5,333,317 | A | | 7/1994 | Dann ......................... 395/600 |
| 5,377,323 | A | | 12/1994 | Vasudevan .................. 395/200 |
| 5,479,408 | A | | 12/1995 | Will .......................... 370/313 |
| 5,557,723 | A | | 9/1996 | Holt et al. ................... 707/506 |
| 5,627,996 | A | | 5/1997 | Bauer ......................... 395/500 |

(Continued)

OTHER PUBLICATIONS

H. Lee Murphy, "Computers Encourage Participation, Fast Results" Crain's Chicago Business, Jan. 18, 1993, 3 pp.

(Continued)

*Primary Examiner*—Paul H Kang
(74) *Attorney, Agent, or Firm*—Merchant & Gould, P.C.

(57) ABSTRACT

In an electronic mail system environment, a system and method for providing message flags, providing custom forms, and providing an autoresponse feature. The e-mail system notifies a recipient when a due date is approaching or when a follow-up action is past due. A custom forms feature allows a user to create and share custom forms without requiring the form to be published or installed by other users. The custom form's attributes are transmitted to the recipient as an element of the e-mail message. An autoresponse feature allows a sender to create a message that includes voting buttons corresponding to the possible responses to a query. A recipient replies by selecting one of the voting buttons. The recipient's vote is automatically tallied in the sender's copy of the message, thus allowing the sender to view a vote tally, a list of recipients, and their response.

13 Claims, 36 Drawing Sheets

U.S. PATENT DOCUMENTS

| | | | |
|---|---|---|---|
| 5,664,183 A | 9/1997 | Cirulli et al. | 707/103 |
| 5,664,185 A | 9/1997 | Landfield et al. | 395/615 |
| 5,701,462 A | 12/1997 | Whitney et al. | 395/610 |
| 5,762,265 A | 6/1998 | Kitamura et al. | 235/51 |
| 5,764,906 A | 6/1998 | Edelstein et al. | 395/200.49 |
| 5,765,038 A | 6/1998 | Flannery et al. | 707/10 |
| 5,800,181 A | 9/1998 | Heinlein et al. | 434/322 |
| 5,835,758 A | 11/1998 | Nochur et al. | 707/102 |
| 5,870,473 A | 2/1999 | Boesch et al. | 380/21 |
| 5,884,284 A | 3/1999 | Peters et al. | 705/30 |
| 5,893,098 A | 4/1999 | Peters et al. | 707/10 |
| 5,923,848 A | 7/1999 | Goodhand et al. | 709/19 |
| 5,950,217 A | 9/1999 | Heinlein et al. | 707/530 |
| 6,175,833 B1 | 1/2001 | West et al. | 707/102 |
| 6,178,430 B1 | 1/2001 | Cohen et al. | 707/501.1 |
| 6,212,553 B1 | 4/2001 | Lee et al. | 709/206 |
| 6,250,548 B1 | 6/2001 | McClure et al. | 235/51 |
| 6,311,190 B1 | 10/2001 | Bayer et al. | 707/104.1 |
| 6,370,139 B2 | 4/2002 | Redmond | 370/354 |
| 6,549,950 B2 | 4/2003 | Lytle et al. | 709/246 |

OTHER PUBLICATIONS

"Disk Image Book and Program Load Facility", IBM-TDB (NN9307465) Jul. 1993, vol. 36, 7., pp. 465-466.

Choi et al.. "Efficient Embedded Web Server for Web-Based Network Element Management", 2000, IEEE Symposium record INOSE3. pp. 187-200.

Putnam, F.A., "Internet-Based Data Acquisition and Control", Nov. 1999, Sensors vol. 16, No. 11, pp. 60-63 (ISSN: 0746-9462).

O'Brien, "Embedded Web Servers", Nov. 1999, Embedded Systems Programming, vol. 12, No. 120, pp. 67-68, 70, 72.

"Printing Follow-Up Items", Jan. 1990, IBM-TDB (NB90U1334) vol. 32, 8B, pp. 334-338.

"Electronic Due Dates", Feb. 1990, IBM-TDB (NB9002345) vol. 32, 9B, pp. 345-347.

"Automated Confirmation of Understanding", Jul. 1993, IDB-TDB (NB9307483) vol. 36, 7, pp. 483-486.

* cited by examiner

Screen Displays - Original Name Resolution

Screen Displays - Nickname Resolution

Flow Diagram - User's Perspective

Flow Diagram - Name Resolution
from Program's Perspective

State Diagram - Nickname Resoution from Program's Perspective

| Item | |
|---|---|
| Property Tag | Value (data) |
| Sender | ... |
| Recipient(s) | ... |
| Subject | ... |
| Body | ... |
| Status | ... |
| Message Flag | ... |
| Due Date | ... |

1100 ---> Status
1105 ---> Message Flag
1110 ---> Due Date

| Read | Status | Encl | From | Subject | Rcvd | Size |
|---|---|---|---|---|---|---|
| N | — | | Bob Winters | Windemere Proposal | 2/12/96 | 2 K |
| Y | | | Drew Lytle | RE: News views | 2/12/96 | 6 K |
| Y | | | Scott Thurlow | RE: \user\specro | 2/12/96 | 3 K |
| Y | | Y | Trio Account | Get on the WWW | 2/11/96 | 12 K |
| Y | √ | | Becky Kaplan | Module Name question | 2/11/96 | 3 K |
| Y | | | Brad Thompson | RE: project status | 2/10/96 | 8 K |
| Y | — | | Pam McBain | upcoming release | 2/6/96 | 4 K |
| Y | | Y | Scott Gode | Terminology | 2/5/96 | 39 K |
| Y | √ | | Brian MacDonald | lunch | 2/2/96 | 5 K |

Fig. 14

| Item | |
|---|---|
| Property Tag | Value |
| Sender | ... |
| Recipient(s) | ... |
| Subject | ... |
| Body | ... |
| Form | ... |
| Length | ... |
| Width | ... |
| Height | ... |

Fig. 19

| Item | |
|---|---|
| Property Tag | Value |
| Sender | ... |
| Recipient(s) | John, Jim |
| Subject | ... |
| Body | ... |
| My Vote | ... |
| Autoresponse Verbs | Chez Jean, Mama Rosa's, Big Bob's |
| PR_REPORT_TAG | Moniker |
| John | ... |
| Jim | ... |

Fig. 26

| Message | Options | Other | Custom |

Importance [Normal ▼]    Sensitivity [Normal ▼]

Categories [_____▼]

2810 — ☑ Use voting buttons:  [Chez Jean; Mama Rosa's; Big Bob's — 2825] — 2815

☐ Have replies sent to:  Approve; Reject — 2820
☑ Save sent message to:  Yes;   No — 2830
                         Yes; No; Maybe 2805 (top toolbar)

FIG. 28

| Read | To Do | Encl | From | Subject | Rcvd | Size |
|------|-------|------|------|---------|------|------|
| N | — | | Bob Winters | Windemere Proposal | 2/12/96 | 2 K |
| Y | | | Drew Lytle | Big Bob's: Christmas Party | 2/12/96 | 2 K |
| Y | | | Scott Thurlow | Chez Jean: Christmas Party | 2/12/96 | 2 K |
| Y | | Y | Trio Account | Get on the WWW | 2/11/96 | 12 K |
| Y | √ | | Becky Kaplan | Module Name question | 2/11/96 | 3 K |
| Y | | | Brad Thompson | RE: project status | 2/10/96 | 8 K |
| Y | — | | Pam McBain | upcoming release | 2/6/96 | 4 K |
| Y | | Y | Scott Gode | Terminology | 2/5/96 | 39 K |
| Y | √ | | Brian MacDonald | lunch | 2/2/96 | 5 K |

Fig. 35

| Message | Options | Other | Custom | Tracking |

From: Betty Johnson (Exchange)  Sent: 10/11/95 1:32 PM

To: My Department (Exchange)

Cc:

Subject: Christmas Party

☐ Vote results: Mama Rosa's-23, Chez Jean-12, Big Bob's-3. ← 3620

| Name | Response | Received |
|---|---|---|
| Erin Dunphy | Mama Rosa's | 10/11/95 2:34PM |
| Bob Smith | Chez Jean | 10/11/95 2:45PM |
| John Late | Mama Rosa's | 10/11/95 2:54PM |
| Christine Ko | Mama Rosa's | 10/11/95 3:08PM |
| Jim Street | Big Bob's | 10/11/95 3:10PM |
| Terace Grop | Mama Rosa's | 10/11/95 3:15PM |
| Jane Parker | Mama Rosa's | 10/11/95 3:15PM |
| Joe Black | Chez Jean | 10/11/95 3:15PM |
| Phillip White | Mama Rosa's | 10/11/95 3:20PM |
| Bruce Redstone | Mama Rosa's | 10/11/95 3:28PM |

FIG. 36

METHOD FOR AUTOMATICALLY IMPLEMENTING SPECIAL FORMS IN AN E-MAIL SYSTEM

CROSS REFERENCE TO RELATED APPLICATIONS

This application is a continuation of application Ser. No. 10/084,589, filed on Feb. 27, 2002 now U.S. Pat. No. 7,010,616, titled Method for Automatically Implementing Special Forms in an E-Mail System; which is a continuation of application Ser. No. 09/019,246 filed on Feb. 5, 1998 now abandoned, titled Method for Automatically Implementing Special Forms in an E-Mail System; which is a divisional of application Ser. No. 08/658,840 filed on May 31, 1996 and issued as U.S. Pat. No. 5,923,848, titled System and Method for Resolving Names in an Electronic Messaging Environment, all of which are incorporated herein by reference.

TECHNICAL FIELD

The present invention relates to a system and method for creating and sending electronic mail, and more particularly relates to a system and method for simplifying the processes of resolving recipient names, indicating action items, utilizing custom forms, and tallying replies from a group of recipients.

BACKGROUND OF THE INVENTION

Electronic mail, or e-mail, is a service that transmits electronic messages from one computer to another. These messages may be simple text messages or more complex messages containing documents and data of various types. The transmission of e-mail messages may range from transmission over a short distance, such as over a local area network between employees in adjoining offices, to transmission over extremely long distances, such as over the global Internet between users on different continents.

Generally, to send an e-mail message via an e-mail system, a user opens an e-mail program module and types a message and other information into an e-mail form. The e-mail form contains a number of fields for the recipients' addresses, the subject of the message, and the message itself. The user may also attach separate files to the e-mail message. Before sending the e-mail message, the user must enter the recipient's e-mail address, which is used by the e-mail system to route the message to the intended recipient.

After composing an e-mail message and entering the recipient's address, the user sends the message by invoking a "send" command. The e-mail system then sends the message to the recipient. At the recipient's computer, the recipient typically will receive a visual or auditory cue, such as a ringing bell, when an e-mail message has been received in the recipient's inbox. The recipient may then open the e-mail program and view a list of the messages in the inbox. The recipient may view the complete text of a message by selecting and opening that message.

E-mail is becoming increasingly popular because it is a quick, convenient, and easy way to exchange information and communicate with others. E-mail offers numerous advantages over other forms of communication. For example, e-mail is less intrusive than a telephone call because the recipient of an e-mail message may wait until a convenient time to retrieve and respond to the message rather than being immediately interrupted. Another advantage of e-mail is the ability to communicate with large groups of people by sending a single e-mail message to multiple recipients. Still another advantage of e-mail is the ability of attaching documents in electronic format to an e-mail message.

E-mail messages are composed in the context of a "form." A form is an object that is used to display a message in a structured format. An e-mail form typically provides a plurality of fields, including an address field, a "From" field, a "Subject" field, a "cc" field, and a "Body" field. The user of the e-mail system composes the message by entering data into some or all of the fields on the form.

E-mail forms typically incorporate verbs, which are commands that a form is capable of executing. Typical verbs include commands such as reply, forward, open, and print. For example, a recipient may generate a reply to an e-mail message by clicking on a reply button. In response to the reply command, the e-mail program carries out the instructions associated with the "reply" verb. This includes copying the data in the address field of the incoming message to the "From" field of the reply, copying the data in the "From" field of the incoming message to the address field of the reply, and adding "Re:" before the data in the "Subject" field.

Although e-mail provides a valuable and useful tool, current e-mail systems are not without their drawbacks. For instance, an e-mail system must have a unique, specific destination address in order to deliver an e-mail message to the correct recipient. In many cases, e-mail addresses are not intuitive derivatives of a person's name and may be difficult for the user to remember. Also, because the address must be specific, a typographical error entered by the user will result in the message being misdelivered or not delivered at all.

Before the e-mail system can send a message, all of the names in the address field must be "resolved," or matched with the valid address of a particular user. In most e-mail systems, the recipients' names are resolved when the user invokes the "send" command or a "check names" command. In either case, the e-mail system resolves unambiguous names without user intervention and prompts the user to resolve ambiguous names by selecting the correct name from a short list.

As an example, Jim Peterson is sending an e-mail message to his friend Dave. In the address field of the message, Jim enters the name "Dave." An address book or directory, which is stored on the server, is used by the e-mail system to match the name "Dave" with the appropriate recipient. In a small company or organization with only one user named Dave, entering "Dave" in the address field would be unambiguous to the e-mail system and the e-mail system would match the name "Dave" to the correct, unique e-mail address. However, in a company or organization with multiple Daves, the name must be resolved to the correct Dave. This method of resolving names is inconvenient because the user must execute an extra step to resolve the names before the message is sent. This is especially inconvenient if a user only sends mail to one "Dave" although the address book contains many "Daves." Also, as companies and organizations expand, the e-mail system address book continues to grow, thereby increasing the chances for ambiguity. The potential is created for false matches resulting in misdirected e-mail.

One attempt to simplify the process of resolving names is to implement a feature that monitors the user's typing of characters in the address field and volunteers the full name when the user types enough characters to uniquely identify one recipient. Alternatively, in another attempted solution, the user can type in a number of characters and get a list of recipients whose name begins with the characters typed in by the user. Neither of these solutions provides a satisfactory solution to the problem of resolving names. First, a long string of characters may need to be entered before a unique name is found. Also, for certain names, such as John Smith, a unique name may never be found even if the entire name is entered. In addition, the user must enter the name exactly as it appears in the directory even if one part of a name is more unique than another part of a name. For example, "MacDonald" is probably more unique than "John," but a user must enter the name as "John Mac . . . " if that is how the name appears in the directory. Furthermore, these attempted solutions require the user's attention to complete the resolution of the names.

In addition to the drawbacks associated with verifying e-mail addresses, current e-mail systems do not provide the user with an effective way to organize and manage the user's e-mail inbox. Many businesses rely on an e-mail system as one of the main modes of communication between individuals, resulting in users often having to deal with large numbers of e-mail messages. In cases where an e-mail user has received messages that delegate responsibilities or request specific follow-up actions, these messages may easily be lost in a flood of other e-mail messages. Even if a recipient has a manageable amount of e-mail messages in his or her inbox, requests for action are often buried in the body of an e-mail message and the recipient may not realize that an action has been requested.

E-mail systems usually provide only rudimentary mechanisms for identifying and sorting important messages that require some sort of action. For example, one mechanism for identifying and sorting important messages is for the sender of the message to set a priority for the message that the recipient will receive with the message. In the alternative, the sender may provide information about the e-mail message in the subject line. For example, the sender may set the priority as "urgent" for a respective e-mail message or type "urgent" in the "Subject" field. However, this mechanism of setting priorities is ineffective because the e-mail message may not require immediate action. The recipient may open and read the message, and then file the message in a "follow-up" folder. Thus, there is the possibility that the recipient will forget to take the action at a later time.

Another mechanism for identifying and sorting important messages is for the recipient of the message to forward the message to himself and change the priority of the message or subject of the message to the priority or subject desired by the recipient. However, re-prioritizing by the recipient suffers from the drawback of the recipient spending extra time and effort to execute the steps of sending a message back to himself. Thus, the previous solutions to organize and identify important e-mail messages, such as those that require action, only achieve adequate results at best.

Another drawback of current e-mail systems is the difficulty in creating and using customized e-mail forms. There are times when a user feels that the fields on an e-mail form simply do not meet their requirements and that it would be useful to add user-specified fields. For example, Jim is working with Shirley to develop a casing for the radio she is designing. E-mail messages containing information about the dimensions of the radio are constantly being sent between the two. Using a normal e-mail message, the information is buried within the message making it difficult to find. As a result, Jim and Shirley would like to create a customized e-mail form with added fields for the length, width, and height of the casing.

Currently, to add fields to an e-mail message, a custom form is created using a separate application program. After the form is created and defined, the form must be placed on a central server for distribution and installed in each user's form registry. Usually, placing the form on the server must be approved and executed by the management information systems (MIS) department. Thus, placing a form on a server may involve some delay and bureaucratic problems After the form is placed on the server, any user of the form must install the form before an e-mail message using this form may be displayed on their screen. For instance, in the above example, Jim would have to install the form on his computer before receiving an e-mail message from Shirley utilizing the form. Therefore, using a form with user-specified fields may be time-consuming and annoying because the form must be created and placed on a server, and the form must be installed on a user's computer before the form can be used.

Another drawback of current e-mail systems is an inability to effectively organize responses to an e-mail message from a group of people. For example, when working with a large group, a user is often required to interact with other group members to make decisions. Using an e-mail message to pose a question to a large group reduces the difficulty of contacting each member of the group for their response. Instead of directly contacting each member of the group, one e-mail message requesting a response can be sent to every member of the group. Each recipient types in their response and sends a reply e-mail message to the user. However, the user still has the task of organizing the replies as they are received and tallying the responses to determine the group consensus. Thus, the user is required to open every reply, read it to determine the response, and tally the responses to decide the consensus of the group. Current e-mail systems do not provide a mechanism for automatically tallying the responses to a question. Instead, the user must manually organize the responses, typically by creating folders for each of the different responses, by creating a spreadsheet with the different responses and the number of replies associated with each response, or simply by tracking the responses on paper. However, these solutions require time and effort on the part of the user and do not directly address the issue of tallying responses.

Therefore, there is a need in the art for an e-mail system that is easier to use and provides more useful organizational features than current e-mail systems.

In particular, there is a need for an e-mail system that simplifies the process of resolving recipient addresses and minimizes the input required from the user.

There is also a need for an e-mail system that provides more useful organizational features for the recipient by distinctly identifying important e-mail messages, such as messages that require follow-up action.

There is a further need for an e-mail system that provides the ability to use custom forms with user-specified fields without requiring the forms to be created and stored on a server.

There is still a further need for an e-mail system that provides more useful organizational features by automatically tallying the responses to a question posed to a group of e-mail users.

SUMMARY OF THE INVENTION

The present invention satisfies the above described needs by providing an improved system and method for composing, processing, and organizing electronic mail message items. The present invention automatically resolves recipient display names while the user is composing the message. The invention provides multiple options for resolving ambiguous names and automatically creates nicknames based on how ambiguous names are resolved. The present invention also allows a sender or recipient to indicate specific follow-up action associated with a message. The message flag may be accompanied by a due date, which generates reminders and past due notices. The present invention also provides an efficient method for sharing custom e-mail forms with other users. A description of the custom form is transmitted as part of the e-mail message and displayed by the recipient's computer. The present invention also automatically tallies multiple responses to a query. The sender sends a message that includes a query and specific choices for the response. The recipient creates a reply by selecting one of the predefined choices. When the original sender receives the reply, the sent mail copy of the message is updated to tally the votes.

Generally described, in one aspect, the present invention provides a method for resolving a display name associated with an intended recipient of a message item, which is sent in the context of an electronic mail system. The method includes receiving the display name in an address field and determining whether the display name uniquely matches one of a plurality of registered users of the electronic mail system. If the entered address data uniquely matches one of the registered users, data corresponding to the matching registered user is displayed. Otherwise, ambiguous address data is displayed.

More particularly described, the present invention provides a method for using nicknames to resolve the name of an intended recipient of a message item. The method includes receiving a display name in an address field and determining whether the display name corresponds to a previously stored nickname. If so, nickname data corresponding to a registered user associated with the nickname is displayed. If no nickname is found, the method determines whether the display name uniquely matches one of a plurality of registered users of the electronic mail system. If so, recipient data corresponding to the matching registered user is displayed. If there is no unique match, the ambiguous address data is displayed.

In another aspect, the present invention provides a method for including a flag with the message item, which is transmitted in an electronic mail system. Flag data is received and stored as one of a plurality of message properties. The e-mail message item is then transmitted to a recipient.

The message item can also include a combination of a due date property and the message flag property. The computer receives due date data indicative of a date by which the follow-up action is to be performed and stores the due date data as one of the plurality of properties.

The present invention also provides a method for displaying the status of a follow-up action associated with the message item. The method includes receiving a message item that includes a status property associated with the follow-up action and determining whether the message item includes the status property. If so, the data associated with the status property is received and is displayed in conjunction with the message item.

More particularly described, the present invention provides an improved message item for transmission in an electronic mail system. The message item includes a message flag property and a status property. The message flag property is indicative of a follow-up action associated with the message item. The status property includes status data indicative of whether the follow-up action has been completed by a recipient of the message item.

In yet another aspect, the present invention provides a method for transmitting custom form data as part of a message item. Custom form data is obtained. The custom form data indicates the layout of a custom form comprising a plurality of fields for displaying field data. The custom form data is stored as one of a plurality of properties associated with the message item. Once the message is composed, the message item, including the form property, is transmitted to the recipient.

The present invention also provides a method for receiving a message item that includes custom form data and displaying the message item in a custom form. A message item, which includes a plurality of properties, is received. The method includes determining whether the message item includes a form property. If the message item includes a form property, the custom form data that is stored in the form property is retrieved and the message is displayed in the context of the corresponding form. If the message item does not include a form property, standard form data is retrieved from a form registry and the message item is displayed in the context of the standard form.

In yet another aspect, the present invention provides a method for sending a message item to a plurality of recipients and automatically tallying the responses. A message item is created, and includes a query and a plurality of predefined responses. The message is transmitted to the recipients. When a reply is received, the response included in the reply is automatically tallied.

The original message item can include an autoresponse property. If so, response data corresponding to the predefined responses is received from the sender of the message item. The response data is then stored in the autoresponse property. Responses are tallied by reading identification data in the reply message and locating a sent mail copy of the original message. A voter property is located in the sent mail copy and the reply data is stored in the voter property of the sent mail copy.

More particularly described, the present invention provides a method for selecting one of a plurality of predefined responses in reply to a message item that includes a query. A message is opened and a plurality of voting buttons is displayed. Each voting button corresponds to one of the predefined responses. Input corresponding to the selection of one of the voting buttons is received and a reply message item is created. Data corresponding to the selected voting button is stored in one of the properties of the reply message.

It is therefore an object of the present invention to provide a method for resolving recipient names in the background.

It is a further object of the present invention to simplify the process of resolving ambiguous names and to automatically create nicknames based on how the ambiguous names are resolved.

It is a further object of the present invention to provide a method for specifying a follow-up action and due date associated with a message item.

It is a further object of the present invention to assist the user in managing e-mail messages that include specific follow-up actions.

It is a further object of the present invention to allow e-mail users to create custom e-mail forms and easily share the custom forms with other users.

It is a further object of the present invention to provide a method for soliciting input from a group of e-mail recipients and automatically tallying their responses.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 11 is a diagram illustrating the data properties that constitute an e-mail message item including a message flag.

FIG. 14 is an illustration of a screen display containing a list view of the messages in a user's inbox in accordance with the preferred embodiment of the present invention.

FIG. 19 is a diagram illustrating the data properties that constitute an e-mail item that uses a custom form in accordance with the preferred embodiment of the present invention.

FIG. 26 is a diagram illustrating the data properties that constitute an autoresponse e-mail message item in accordance with the preferred embodiment of the present invention.

FIG. 28 is an illustration of a screen display of an options page for selecting an autoresponse message.

FIG. 35 is an example of a screen display of an inbox of the sender of an autoresponse message in accordance with the preferred embodiment of the present invention.

FIG. 36 is an example of a screen display of the sent mail copy of an autoresponse message in accordance with the preferred embodiment of the present invention.

DETAILED DESCRIPTION OF THE PREFERRED EMBODIMENT

Figure 1:
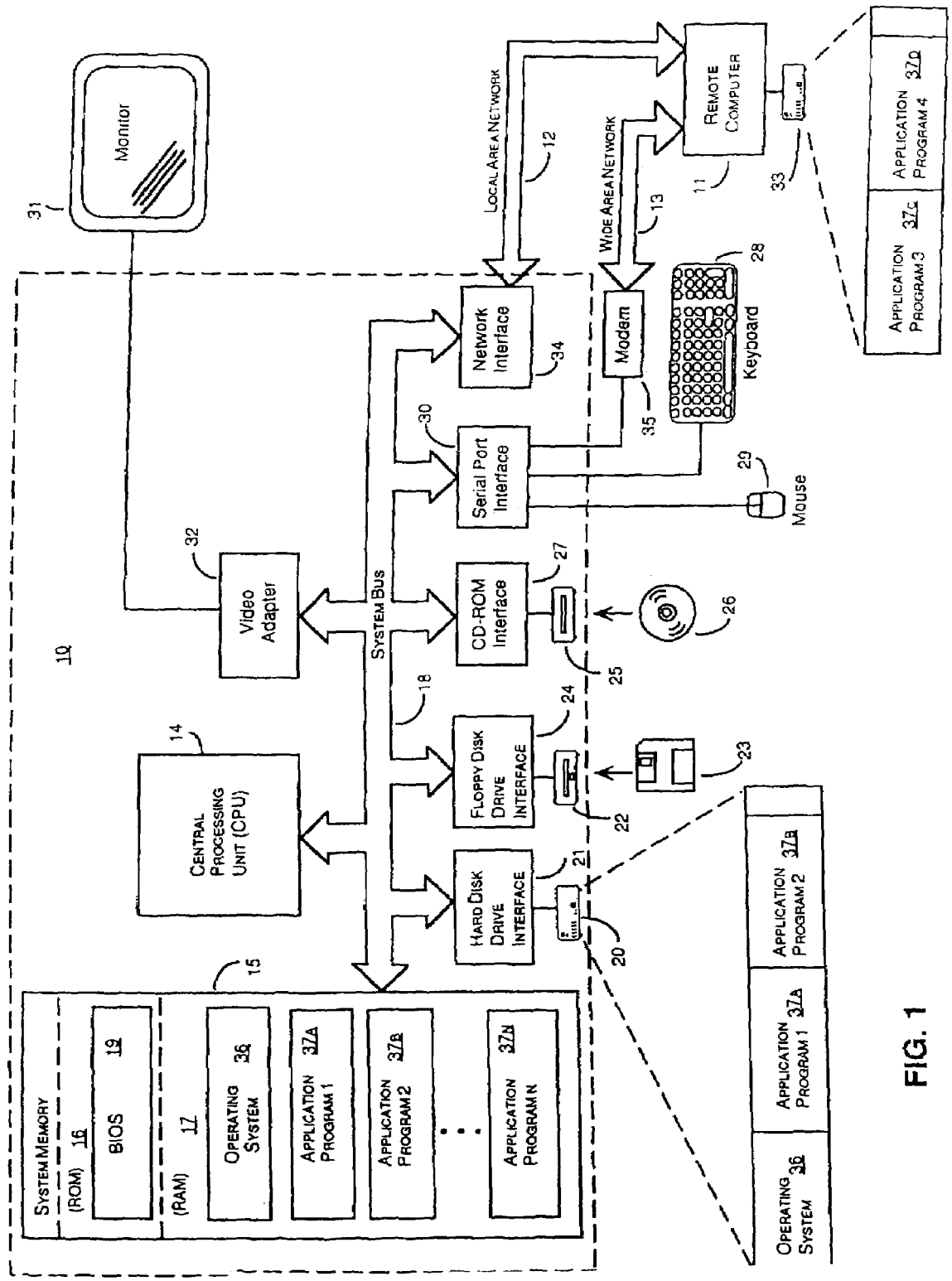
FIG. 1 is a block diagram of a personal computer that provides the operating environment for the preferred embodiment of the present invention.

The present invention is directed to features associated with an electronic mail (e-mail) program module. The preferred embodiment of the present invention is represented by the "MICROSOFT OUTLOOK" program, which is a workgroup personal information management program published by Microsoft Corporation of Redmond, Wash. Briefly described, the preferred program allows users to manage their own calendar, messages, tasks, notes, and contacts and to share this information with others. Like many personal information managers, the preferred application program is divided into several modules, including a calendar manager, a task list manager, a contact manager, a message manager (e-mail), and a notes manager.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, flags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIGS. 1-5 illustrate various aspects of the preferred computing environment in which the present invention is designed to operate. Those skilled in the art will immediately appreciate that FIGS. 1-5 and the associated discussion are intended to provide a brief, general description of the preferred computer hardware and program modules, and that additional information is readily available in the appropriate programming manuals, user's guides, and similar publications.

The Computer Hardware

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a central processing unit (CPU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

The Operating System

Figure 2:
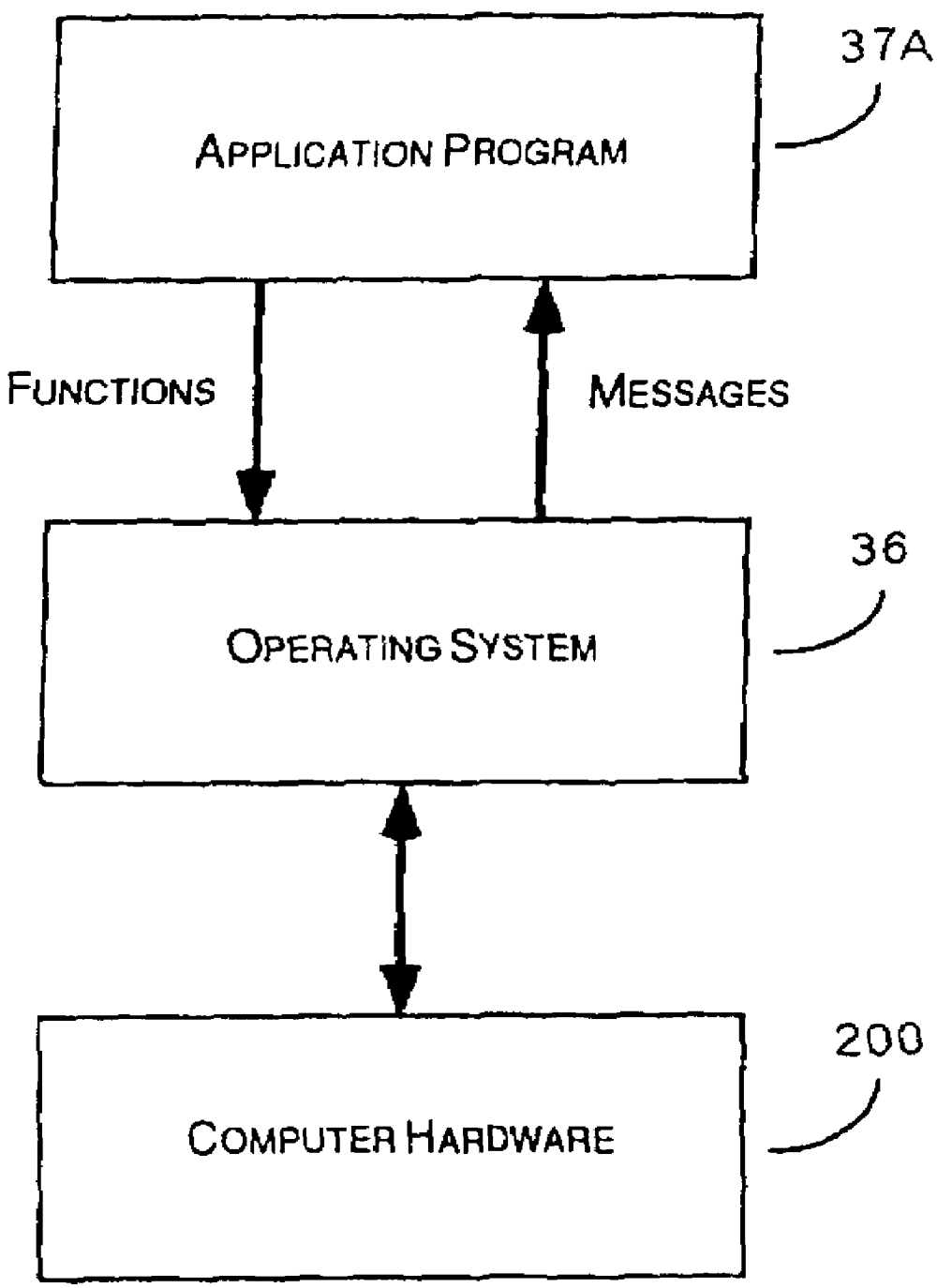
FIG. 2 is a block diagram illustrating the interface between a computer's input/output devices, an operating system, and an application program.

FIG. 2 is a simplified block diagram illustrating the interaction between the computer hardware 200, the preferred operating system 36, and an application program 37a. Referring now to both FIGS. 1 and 2, when the personal computer 10 is turned on or reset, the Basic Input/Output System (BIOS) 19, which is stored in the ROM 16, instructs the CPU 14 to load the operating system 36 from the hard disk drive 20 into the RAM 17. Once the operating system 36 is loaded into RAM 17, the CPU 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the CPU 14 to load the program code into RAM 17 from either the local hard disk drive 20, floppy disk 23, CD-ROM 26, or the remote memory storage device 33. Once the application program 37a is loaded into the RAM 17, it is executed by the CPU 14. In case of large programs, the CPU 14 loads various portions of program modules into RAM 17 as needed.

As discussed earlier, the preferred embodiment of the present invention is embodied in the "MICROSOFT OUTLOOK" program, which is designed to operate in conjunction with Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" published by Microsoft Press and "Advanced Windows" published by Microsoft Press.

The MAPI Messaging Architecture

In the context of the present invention, the primary interaction between the preferred program and the operating system involves messaging related tasks. The preferred operating system incorporates the Messaging Application Programming Interface (MAPI). The MAPI architecture is designed to make it easy for programmers to write messaging-enabled applications that are independent of the underlying messaging system. MAPI provides high-level function that can be used to implement sophisticated messaging features with a relatively small amount of code. The code deals only with functions for sending, receiving, and addressing messages. The underlying messaging system is completely transparent. MAPI also provides other message-related functionality, such as access to address books.

Figure 3:
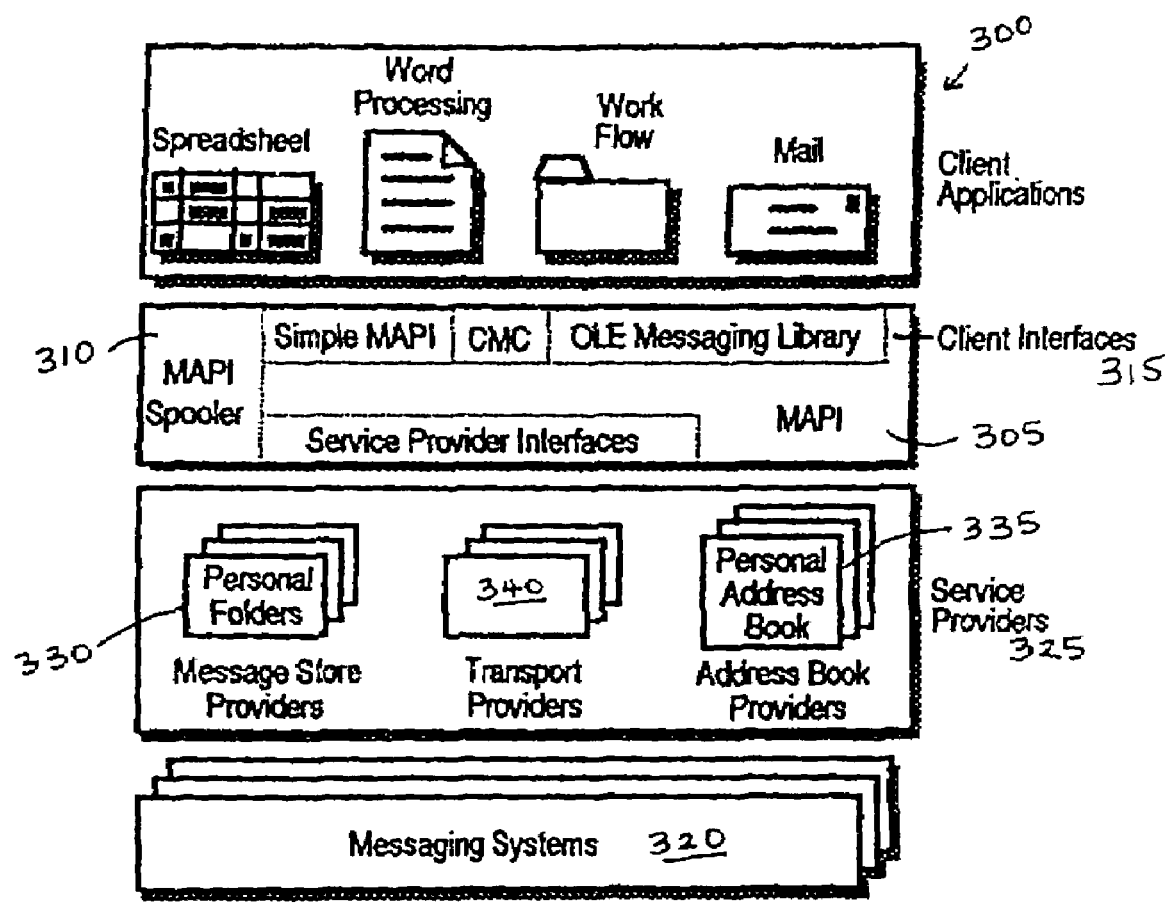
FIG. 3 is a diagram illustrating the modular architecture defined by the Messaging Application Programming Interface (MAPI).

FIG. 3 illustrates the modular architecture defined by MAPI. The client applications 300 are application programs that take advantage of the MAPI subsystem 305. Client applications 300 implement messaging tasks as either their primary or secondary focus. Messaging-based client applications, such as applications that send and receive electronic mail, implement messaging tasks as their primary focus. For non-messaging client applications, which are referred to as being "messaging-enabled" or "messaging-aware," it is a secondary feature.

The MAPI subsystem is made up of the MAPI spooler 310, a common user interface (not shown), and the programming interfaces 315. The MAPI spooler is a separate interface that is responsible for sending messages to and receiving messages from a messaging system. The common user interface is a set of dialog boxes that gives client applications a consistent look and users a consistent way to perform tasks.

The programming interfaces 315 are used by the MAPI subsystem 305, by client applications 300, and by service provider writers. The main programming interface is an object-based interface known as the MAPI programming interface, which is based on the OLE Component Object Model. Client applications may also utilize any of three other interfaces, including simple MAPI, Common Messaging Calls (CMC) and the OLE Messaging Library, which are primarily for messaging-enabled and messaging-aware client applications.

The MAPI spooler 310 is a separate process within the MAPI subsystem 305 and is responsible for sending messages to and receiving message from a messaging system 320. The spooler runs as a background process and also performs several functions related to messaging distribution. These include informing a client application when a new message has been delivered, invoking message preprocessing and post processing, generating reports that indicate that message delivery has occurred, and maintaining status on processed recipients.

The MAPI service providers 325 are located between MAPI subsystem 305 and the messaging systems 320. Service providers are drivers that connect MAPI client applications 300 to an underlying messaging system 320. Most messaging systems include three types of service providers: message store providers 330, address book or directory providers 335, and message transport providers 340. The service providers work with MAPI to create and send messages in the following way. Messages are created using a form that is appropriate for the specific type, or class, of message. The completed message is addressed to one or more recipients. When the client sends the message, the message store provider 330 checks that each recipient has a unique and valid address and that the message has all of the information necessary for transmission. If there is a question about a recipient, such as can occur when there are multiple recipients with the same name, an address book provider resolves the ambiguity. The message in then placed in the outbound queue.

Address book providers 335 handle access to directory information. Depending on the type of recipient and the address book provider, there is a wide range of information that can be made available. For example, all address book providers 335 store a recipient's name, address, and address type and organize the data using one or more containers. MAPI integrates all the information supplied by the installed address book providers into a single address book, thereby presenting a unified view to the client application. The users of client applications can view the contents of address book containers and in some cases modify it. MAPI's Personal Address Book is an example of a modifiable address book container that allows new entries to be added and exiting entries to be modified or deleted.

Figure 4:
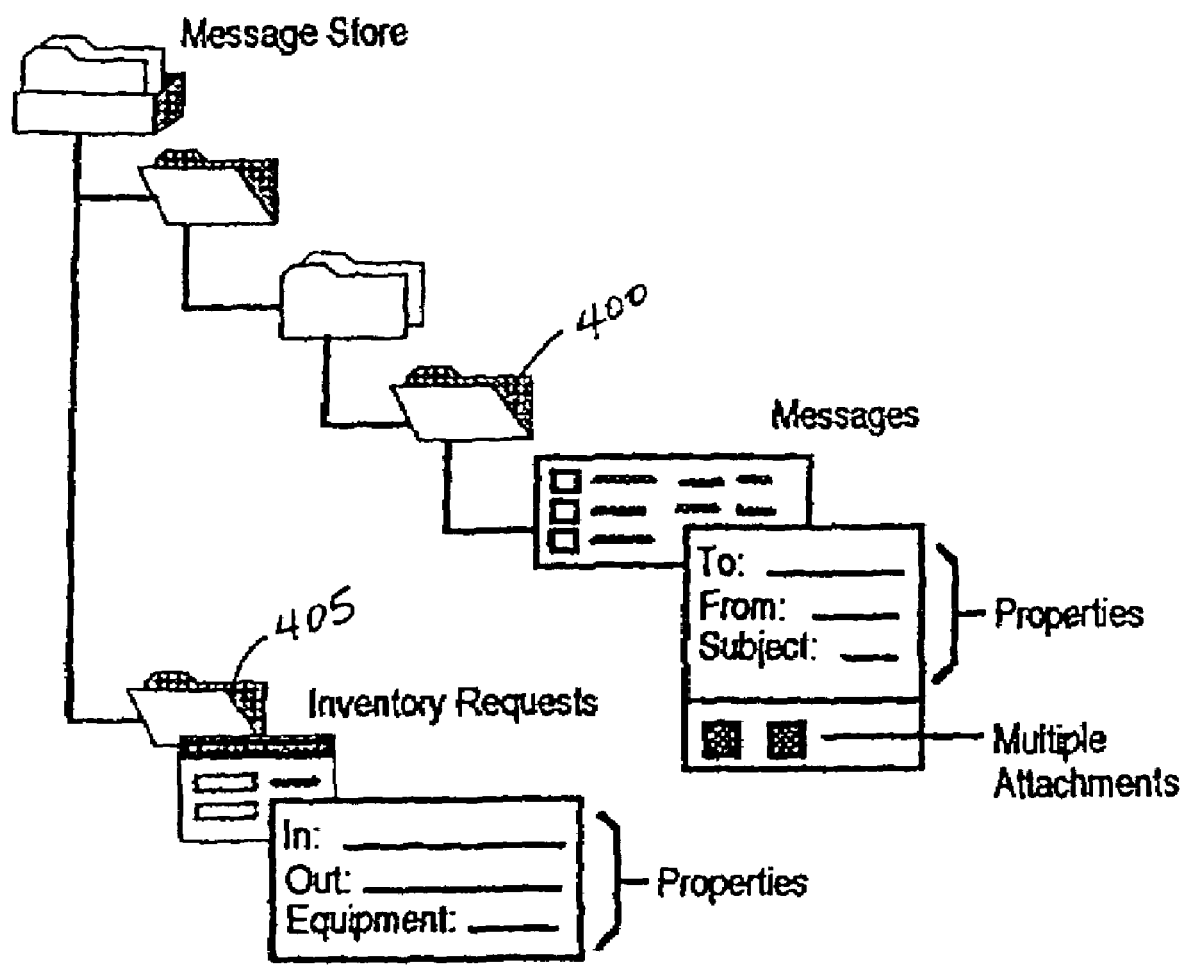
FIG. 4 is a diagram illustrating the hierarchical arrangement of a MAPI message store.

Message store providers 330 handle the storage and retrieval of messages and other information for the users of client application. As illustrated in FIG. 4, the message information is organized using a hierarchical system known as a message store, which is implemented in multiple levels, with containers called folders holding messages of different types. There is no limit to the number of levels in a message store, and folders can contain many sub-folders.

Transport providers 340 handle message transmission and reception. They control the interaction between the MAPI spooler 310 and the underlying messaging system 320. They also implement security if necessary and take care of any pre-processing and post-processing tasks that are required. Client applications 300 communicate with the transport providers 340 through a message store provider 330. When an incoming message is detected, the transport provider informs the MAPI spooler and the message is delivered to the appropriate message store. To handle outgoing messages, the message store moves the message to the outbound queue, informs the MAPI spooler, and the spooler transfers it to the appropriate transport providers.

The operation of these MAPI components is illustrated by describing the flow of an e-mail message through these components. The user of a client application 300 sends a message to one or more recipients. A message store provider 330 initiates the sending process and formats the message with additional information needed for transmission. The MAPI spooler 310 receives the message, performs any required preprocessing, and delivers it to the appropriate transport provider 340. The transport provider 340 gives the message to its messaging system 320, which sends it to the intended recipient(s). When a message is received, the transport provider 340 receives a message from its messaging system 320 and notifies the MAPI spooler 310. The spooler 310 performs any necessary post processing and informs the message store provider 330 that a new message has arrived. The notification causes the client application 300 to refresh its message display, which enables the user to read the new message.

Client application users can access a summary view of the messages contained with each folder or view them individually with a form. Whether the client displays a standard form supplied by MAPI or a customer form supplied by a form developer depends on the type, or class, of the message. In FIG. 4, the first folder 400 contains note messages and uses the MAPI standard note form. The second folder 405 contains inventory request messages and uses a custom inventory form. The information on both forms represents the properties, or attributes, of the message. Messages are the units of data transferred from one user to another. Every message contains some text, which is formatted simply or more intricately depending on the form that is used, and envelope information that is used for transmission.

A MAPI property is an attribute of a MAPI object, and describes something about the object, such as the subject line of a message of the address type of a distribution list. Every MAPI property has a value, a type, and an identifier. The value is the descriptive data, such as the text in a message body. The type describes the kind of data, such as a string, numeric, or Boolean. The identifier is the number that uniquely describes the property. The identifier and type are combined to form a "property tag," which is a constant that can be used to easily refer to the property. Property tags share a common format they begin with the prefix "PR" and are made up of one or more words that describe the property. For example, PR_MESSAGE_BODY is the tag for the message body property. The property tag and value are stored together in system memory 15 (FIG. 1) as a single data structure.

MAPI also employs "profiles," which are collections of information about the message services and service providers that a user of a client application 300 wants to be available during a particular MAPI session. Every user has at least one profile. Multiple profiles may be used in some cases. For example, a user might have one profile to work with a server-based message store service and another profile to work with a message store service on the local computer. A user may have profiles on more than one computer. Similarly, a computer may store profiles for more than one user. Profiles provide a flexible way to select combinations of message systems.

In the MAPI environment, a form is a viewer for a message. Each message has a message class that determines the particular form that is used as its viewer. MAPI defines a few messages classes and has implemented the forms for viewing these messages. Client application developers can create new message classes and custom forms for viewing messages with the new classes.

Figure 5:
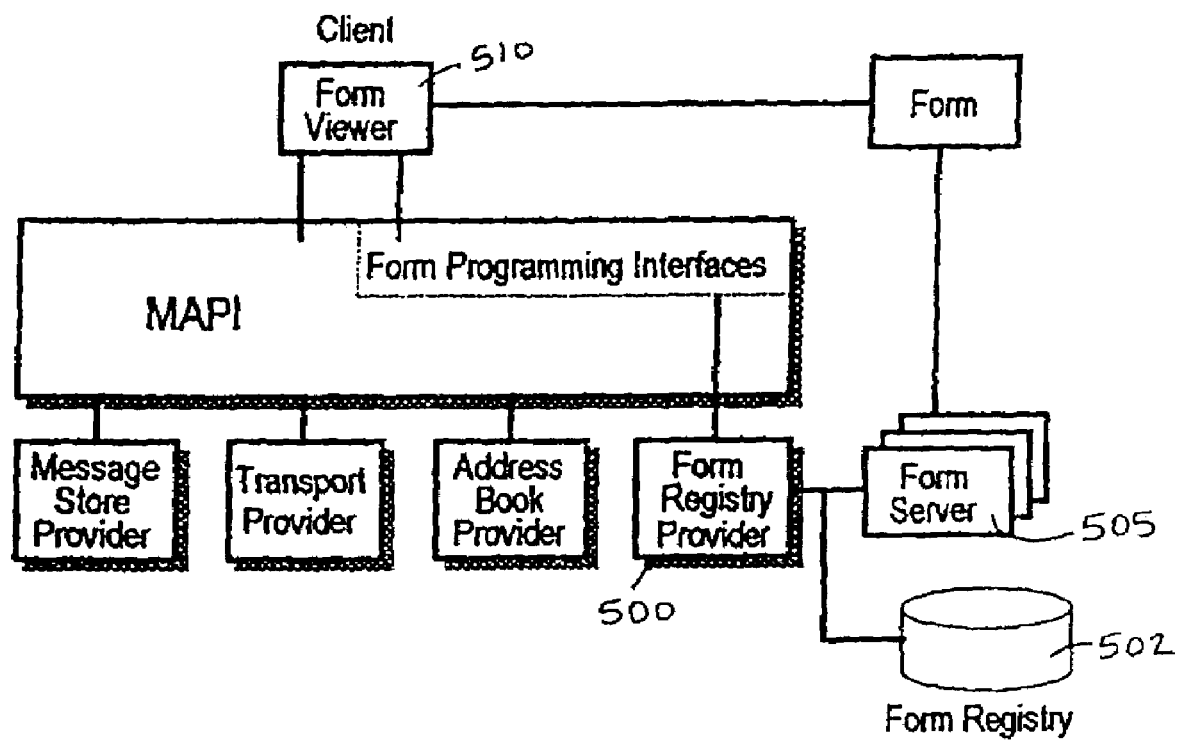
FIG. 5 is a diagram illustrating the MAPI form architecture.

Every custom form implements a set of standard menu commands (e.g., open, create, delete, and reply) and a set of commands that are specific to that particular form. These commands are also referred to as "verbs." FIG. 5 illustrates the MAPI form architecture, which involves three main components: a form registry provider 500, a form server 505, and a form viewer 510.

The form registry provider 500 maintains a library of information about all of the forms available on the computer and enables the client to select a form that is suitable for the message being displayed. Form data is stored in a form registry 502, which is stored in one of the computer's memory storage devices. The form server 505 is responsible for displaying the form and providing the information for the display. The form server manages the user's interaction with the form by interpreting the menu selections and processing the messages. The form viewer 510 is a component within a client application that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft Corporation, and which is incorporated herein by reference.

The Preferred Application Program

As mentioned above, the preferred embodiment of the present invention is represented by the "MICROSOFT OUTLOOK" workgroup personal information manager, which is published by Microsoft Corporation. The preferred client application is divided into several modules, including a calendar manager, a task list manager, a contact manager, a message manager (e-mail), and a notes manager. In the preferred client application, integration between the modules is both simple and extensive because all information is stored in a MAPI data store, which is an extensible, object-oriented database. The preferred application program incorporates the features of MAPI version 1.0.

All folders (containers) contain objects, or items. In the preferred application program, there are a variety of kinds of items: e-mail items, appointment items, task items, address items, etc. Items have a set of fields and a behavior associated with them. For example, an e-mail item has To, From, CC, Subject, date and time fields among others. The behavior of e-mail items includes knowledge of what it means to Forward or Reply/Reply All.

Fields are atomic units of data such as the subject and received date of a message. In most cases, a field belongs to an item. A field is distinct from a "property," which refers to an underlying atomic unit of data at the object storage level, e.g. in a MAPI message. Fields map to properties, but the mapping is not necessarily one-to-one.

A user stores information in the form of items. Items, in turn, reside in folders. A message is a collection of properties. Items are composed of fields. For example, the "subject" in an e-mail note would be a field called "subject" in the e-mail item. In a MAPI store, objects (messages) have a similar structure, except they are composed of properties. In most cases, a field maps directly to a MAPI property. However, there can actually be a many-to-many mapping between fields and the MAPI properties in which they are stored.

In the preferred application program, every item is initially created from a template. A template is the "mold" from which new items are made and as such describes the fields and the item—the data types, default values, formatting rules, etc. For example, there would be a default template for each kind of item listed above: appointments, to-do items, notes, e-mail messages, etc.

The fields in an item may be different than the fields in the template it came from, because items can have custom fields which other instances of the templates do not have. An item always has a template associated with it, however, even if it has so many custom fields that it bears little resemblance to the original templates.

The user creates a template by creating an item, customizing it by adding or deleting fields as necessary, setting initial values for fields and then saving it, giving the template a name. The user can either create a new template (by giving it a new name) or replace the existing one. One way this would be used is to make a template out of an item which has one or more custom fields; if the user thinks that an item with that set of fields is useful for more than one or two items, this allows an easy way to do so.

From this brief description, those skilled in the art will appreciate that the preferred application program provides a wide variety of features and functions in addition to those included in the brief description presented above. For additional information regarding the "MICROSOFT OUTLOOK" application program, the reader may refer to the documentation that is distributed with the program.

The Preferred Method for Automatic Name Checking

When an e-mail user composes an e-mail message, the user identifies the recipient(s) of the message by entering one or more display names in the message's address field. Before the message can actually be transmitted by the e-mail system, the system must match each display name entered in the address field to the specific e-mail address (or address book entry) of a registered user. The e-mail addresses of all registered users are referred to as aliases, and are maintained in a system directory. The directory may cross reference each alias to other information about the user, such as first and last name, department, office location, and phone number. The process of matching the display name(s) to an e-mail address or alias is referred to as "resolving" the names.

In most e-mail systems, the display names are resolved when the user attempts to send the message, or when the user invokes a "check names" command. In either case, the e-mail program resolves unambiguous display names without requiring any additional input from the user. In order to resolve ambiguous display names, the e-mail program displays a dialog box that allows the user to select the intended recipient from a list of possible matches.

The present invention provides a method for resolving names in the background, which means that the user may continue to use the computer to perform other tasks while the display names are being resolved. In the preferred program, the display names are typically resolved while the user is composing the remainder of the e-mail message. The present invention also provides an improved system for resolving ambiguous names. The present invention automatically remembers how ambiguous names are resolved the first time they are encountered and uses that information to resolve those names in the future.

Figure 6A:
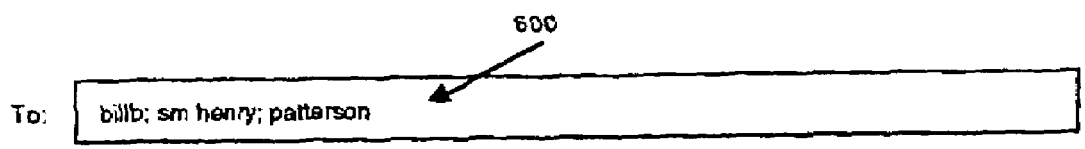
FIG. 6, consisting of FIGS. 6a-c, illustrates the principal user interface provided by an automatic name checking feature of the preferred embodiment of the present invention.
Figure 6B:
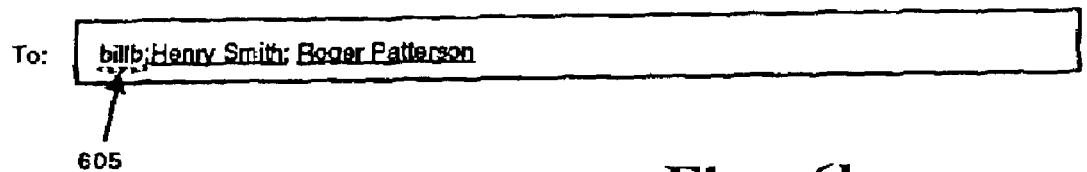
Figure 6C:
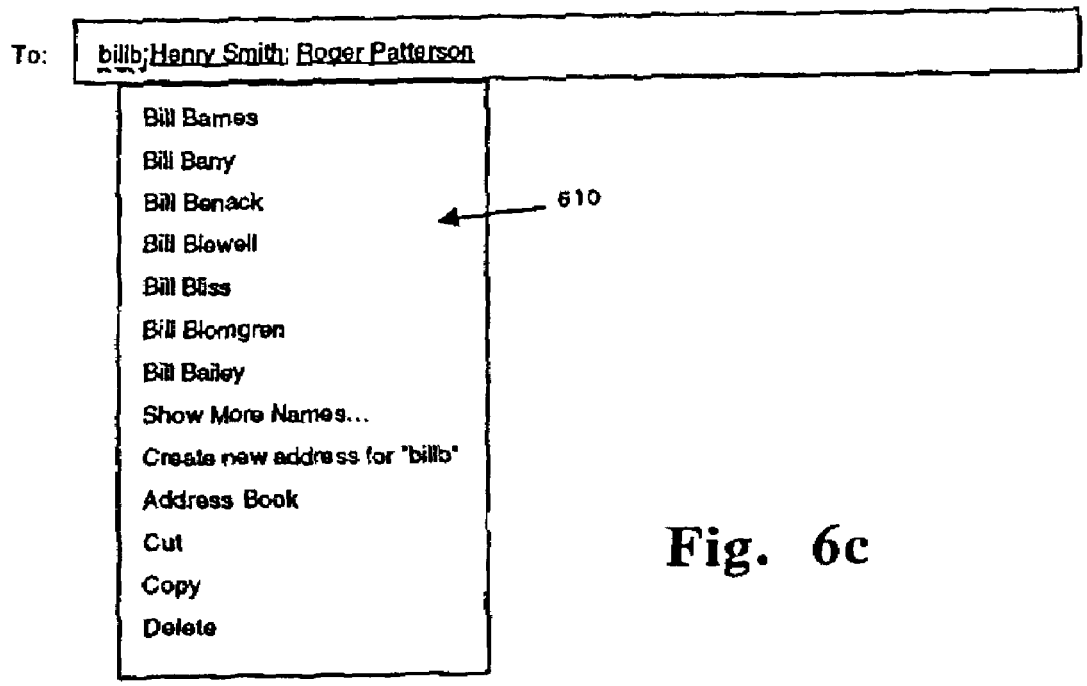
Figure 7A:
FIG. 7, consisting of FIGS. 7a-c, illustrates the user interface associated with the process of resolving nicknames in accordance with the preferred embodiment of the present invention.
Figure 7B:
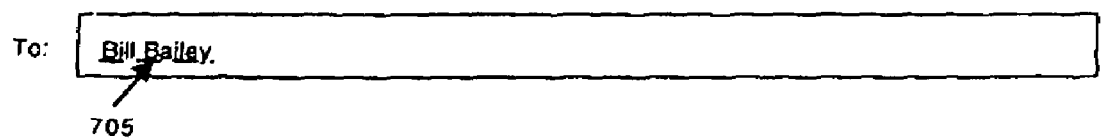
Figure 7C:
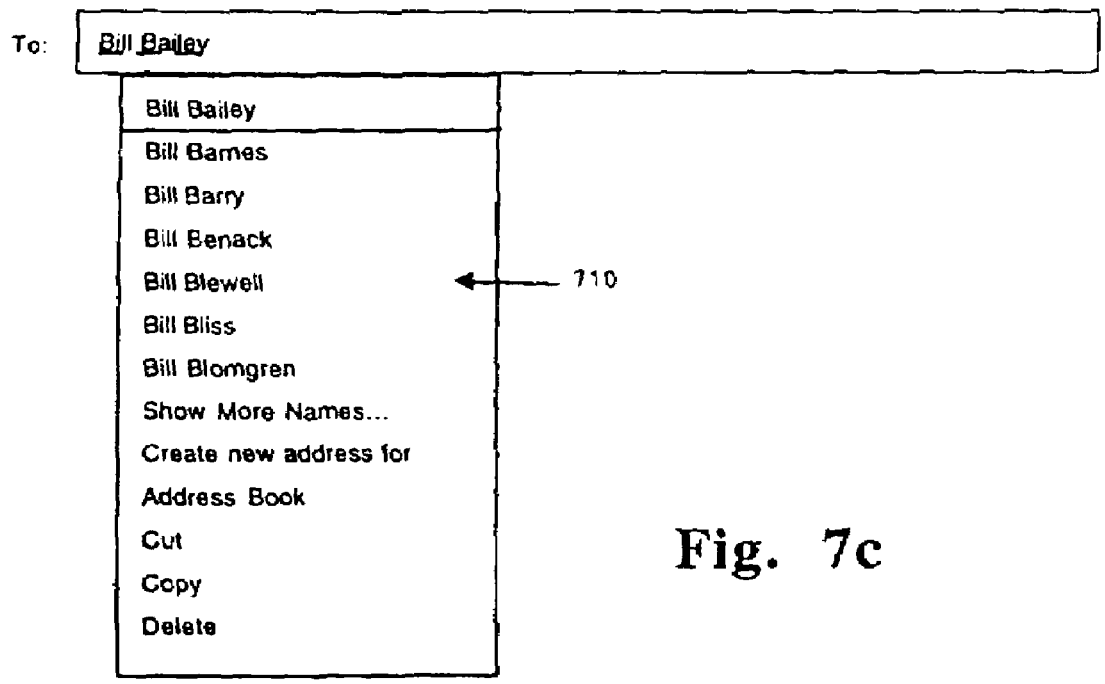

FIGS. 6 and 7 illustrate the user interface that is employed by the preferred embodiment of the present invention. FIGS. 6a-6c illustrate a process for resolving names in accordance with the preferred embodiment of the present invention. FIGS. 7a-7c illustrate the operation of the preferred automatic nickname resolution feature.

FIG. 6a illustrates an address field 600 of an e-mail form that is being used to compose a message item. The form and address field 600 are displayed on the monitor 31 (FIG. 1). At this point, the user has typed in three display names, which provide identifying information about each of the intended recipients. The entered display name may include all or part of the intended recipient's first name, last name, and/or e-mail alias. Each display name is preferably separated by an appropriate delimiter, such as a semicolon.

As soon as the user moves the cursor to another field on the e-mail form, the e-mail program module begins to resolve the recipient names in the background, while the user continues to compose the remainder of the message. As mentioned above, "resolving" the names means attempting to match the display names in the address field to specific user aliases that are included in a centralized address book or directory, which is typically stored on a remote server, such as remote memory storage device 33 (FIG. 1). In the preferred application program, the e-mail system searches several address book fields in an effort to match the display names with the first name, last name, and/or alias of a registered user. Thus, in this example, the e-mail program will attempt to match "billb," "sm henry," and "patterson" with specific address book entries belonging to registered users.

FIG. 6b illustrates the results of the effort to resolve the names. If a display name is unambiguous and matches only one registered user, the name of that user is inserted in the address field. If the display name is ambiguous, the e-mail program indicates that the display name needs to be manually resolved by displaying the display name and a predetermined indicia, such as a squiggly line 605 beneath the display name. FIG. 6b indicates that the display names "sm henry" and "patterson" were unambiguously matched to "Henry Smith" and "Roger Patterson," respectively. Names that are unambiguously matched appear with a regular underline beneath the display name. The squiggly line beneath the display name "billb" indicates that the e-mail system was unable to find a unique match for that display name.

FIG. 6c illustrates the process by which a user manually resolves ambiguous names. In the preferred system, the user places the cursor over the unresolved display name and clicks the right mouse button. In response, the e-mail program displays a context menu 610 that includes a list of possible matches. In this case, the possible matches include users whose first name is Bill and whose last name begins with the letter "B." If the intended recipient's name is displayed in the context menu 610, the user may select the correct name from the list.

If the intended recipient's name is not displayed in the context menu 610, the user may choose one of several options. For example, the "show more names" command in the context menu 610 indicates that there are more possible matches. If the user selects this command, a dialog will display additional names from which the user may select. The "create new address for billb" option in the context menu 610 allows the user to create an entry in his or her personal address book. Those skilled in the art will appreciate that this is typically used to store addresses of e-mail recipients who are not registered users on the local e-mail system. For example, if "billb" is a friend that the user communicates with via Internet e-mail, the user can record Bill's Internet e-mail address in his or her personal address book. The "address book" command in the context menu 610 instructs the e-mail program to display the e-mail system's complete address book, from which the user may select the e-mail address of the intended recipient.

In addition to the features described in conjunction with FIGS. 6*a-c*, the preferred e-mail program module automatically creates a list of nicknames that are based on how the user resolves ambiguous display names. This allows a user to use convenient, but ambiguous, display names to identify intended recipients. For example, if the user frequently sends e-mail messages to Bill Bailey, he or she may prefer to use "billb" as a convenient nickname although it is ambiguous. In FIG. 7*a*, the user has entered "billb" in the address field 700. As before, the e-mail system will attempt to match "billb" to an e-mail alias. However, an e-mail system in accordance with the preferred embodiment will check a nicknames memory cache, which is stored in system memory 15 (FIG. 1), to see if the user has manually resolved the ambiguous display name "billb" in the past. If so, the e-mail program will display the previous recipient's full name and indicia that indicates this is a nickname. In the preferred e-mail program, resolved nicknames are displayed with blue dashed lines beneath them. In this example, the dashed line 705 beneath "Bill Bailey" indicates to the user that Bill Bailey is the user that is currently associated with the nickname "billb" (FIG. 7*b*).

If Bill Bailey is the intended recipient, the user need not take any other action before sending the message. However, if the user intended to send the message to someone other than Bill Bailey, the user may override the nickname using a context menu 710 (FIG. 7*c*). This process is identical to the process for resolving names described in conjunction with FIG. 6*b*, except that the first name listed in the context menu 710 is the name to which the nickname has been matched. If the user overrides the previous nickname, the "billb" name in the nicknames memory cache is redefined to correspond to the most recent intended recipient. Thus, a nickname appears only once in the nickname list and is overwritten as changes or corrections are made by the user.

Figure 8:
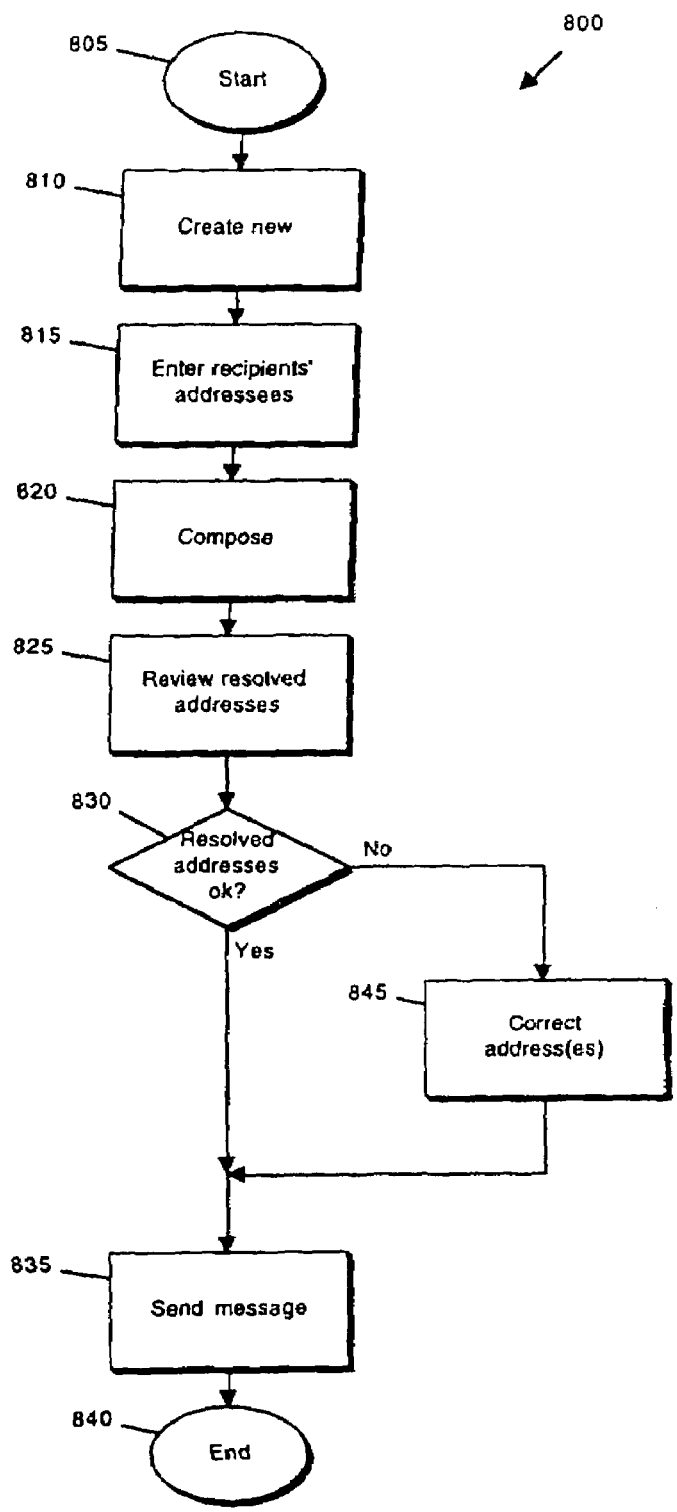
FIG. 8 is a flow diagram illustrating the preferred method for resolving e-mail addresses, as performed by the user.

FIG. 8 is a flow diagram illustrating the preferred process 800 by which a user enters and resolves display names. Those skilled in the art will appreciate that although the method 800 is described primarily in terms of steps carried out by a user, the present invention is a computer-implemented process that is carried out by a computer in response to input from the user and instructions provided by the preferred e-mail program module.

The process 800 begins at start step 805 and proceeds to step 810 when the user selects the command that creates a new message. At step 815 the user enters display names that indicate the identity of the of the intended recipients. As mentioned earlier, the display names may include all or part of the recipient's first name, last name, or e-mail alias. At step 820 the user moves the cursor out of the address field 600 (FIG. 6) and continues to compose the remainder of the message.

At step 825 the user reviews the addresses that are displayed in the address field 600 (FIG. 6). At this point, the e-mail system will have attempted to resolve the names in the background and displayed the results in the address field. At step 830 the user determines whether any of the display names need to be resolved manually. As mentioned above, this will be the case for ambiguous display names, which are preferably displayed with a squiggly line beneath them, or for incorrectly resolved nicknames. If none of the display names need to be resolved manually, the user goes to step 835 and sends the e-mail message. From there, the method terminates at step 840.

If, at step 830, the user determines that one or more of the display names needs to be manually resolved, the user goes to step 845. At step 845 the user manually resolves the display names using the context menu and other options described above in conjunction with FIGS. 6*c* and 7*c*.

Figure 9:
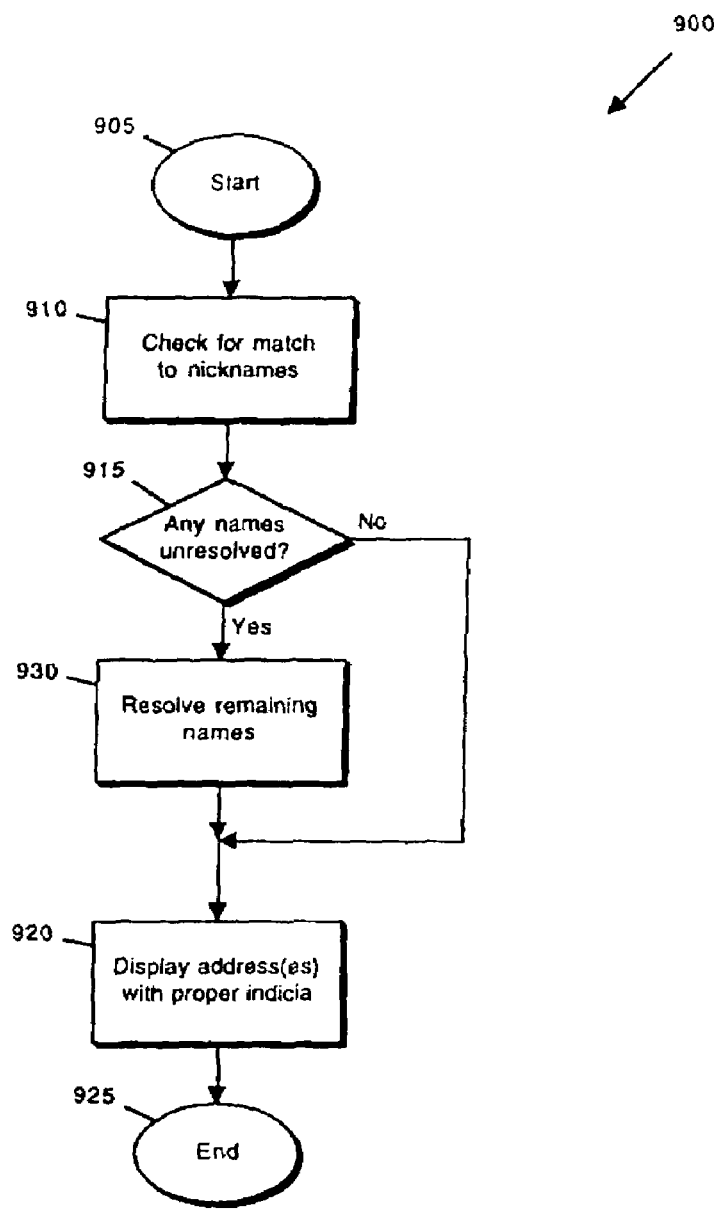
FIG. 9 is a flow diagram illustrating the preferred method for resolving e-mail addresses, as performed by the computer.

FIG. 9 is a flow diagram that illustrates the preferred method 900 by which the computer attempts to resolve the display names entered in the address field. Although the method 900 is described in terms of tasks carried out by a computer, those skilled in the art will appreciate that the present invention is a computer-implemented process that is carried out by the computer in response to input from the user and instructions provided by the preferred e-mail program module.

The method 900 begins at start step 905 and proceeds to step 905 when the user moves the cursor out of the address field and to another field on the e-mail form. At step 910 the computer first checks to see if the display names in the address field corresponds to a nickname that is stored in the nicknames memory cache, which is stored in the computer's memory storage devices as part of the user's profile. At step 915 the computer determines whether any display names remain to be resolved. If all of the display names were resolved by matching nicknames, the computer goes to step 920 and displays the address data with the proper indicia. As discussed above, in the case of nicknames, the full name of the recipient is inserted in the address field and is preferably marked with a blue dashed line beneath it. From step 920, the computer proceeds to step 925 and the method 900 terminates.

If, at step 915 the computer determines that there are additional display names to resolve, the computer goes to step 930 and attempts to resolve the remaining display names. In the preferred e-mail program, this is accomplished by calling the appropriate MAPI functions, such as MAPIResolveName. Those skilled in the art will appreciate that this MAPI function handles the addressing chore of resolving informal names with actual e-mail aliases. From step 930 the computer proceeds to step 920 and displays the address data with the proper indicia. As discussed above, the full name of unambiguous recipients is inserted in the address field. Ambiguous addresses are preferably marked with a squiggly line beneath them. From step 920, the computer proceeds to step 925 and the method 900 terminates.

Figure 10:
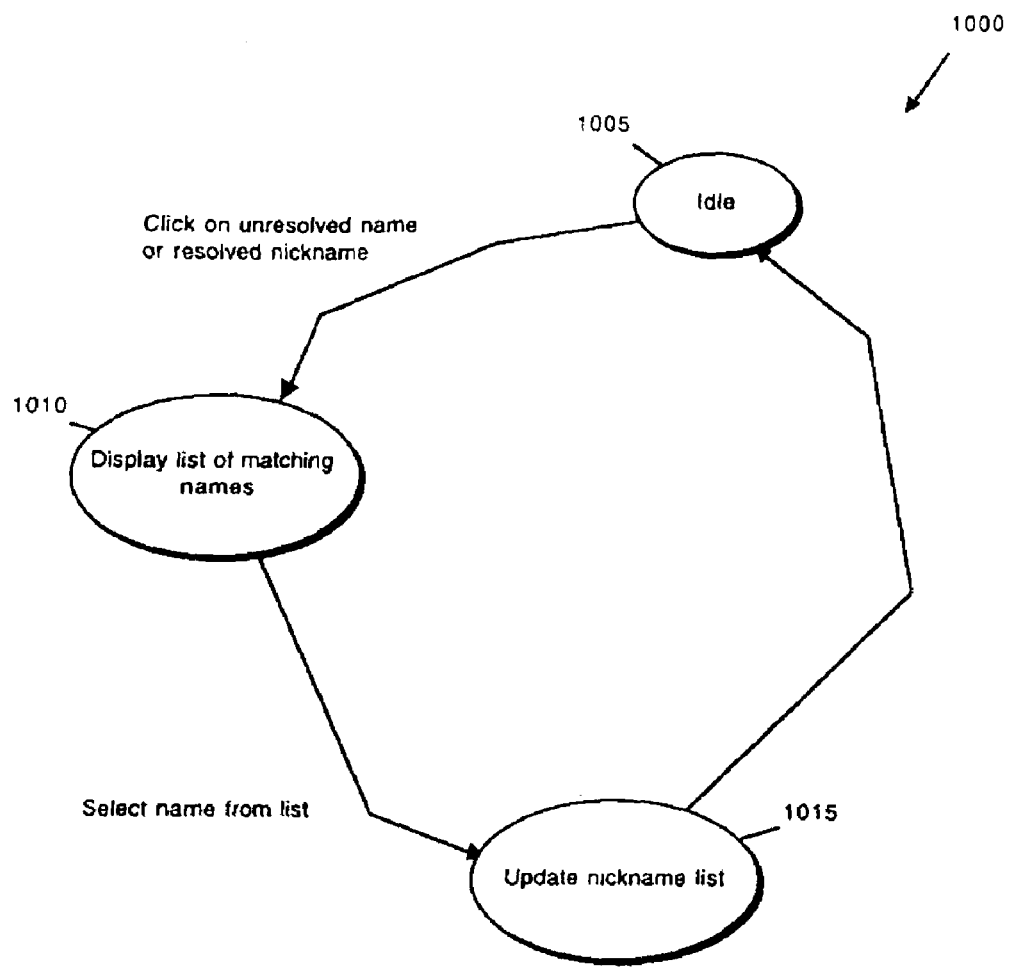
FIG. 10 is a state diagram illustrating the preferred method for resolving nicknames, as performed by the computer.

FIG. 10 is a simple state diagram that illustrates the method 1000 by which the computer creates and maintains the list of nicknames. This process has also been described in conjunction with FIGS. 6 and 7. The method 1000 begins at the idle state 1005. At this point, the computer has displayed at least one ambiguous display name or nickname in the address field. When the user selects a nickname or an ambiguous display name, the computer goes to state 1010 and displays a context menu 610 (FIG. 6) that includes a list of possible matches (see FIGS. 6*c* and 7*c*).

When the user selects one of the names from the context menu, the computer goes to state 1015 and updates the nickname list. As described above, the nickname list is stored in a memory cache that is part of the user's profile, and is used to automatically create nicknames. The nickname is stored with the actual e-mail alias or address book entry of the intended recipient. If this is the first time a nickname is resolved, it is added to the nickname cache. If the nickname was earlier matched to a different alias, the nickname list is updated to reflect the current recipient. In the preferred system, the nickname file is part of the user's profile, which is stored on one or more of the computer's memory storage devices.

When a user enters an Internet e-mail address in the form of xxxxx@yyyyy.zzz, the user need not create a new name in his or her directory before the name can be resolved. The preferred e-mail system simply identifies such an address as an Internet address and resolves it without further user intervention.

Those skilled in the art will appreciate that in the preferred application program, addresses are also resolved when the user sends the message or if the user selects the "check names" command. As such, the preferred embodiment is implemented without requiring any changes to these features. In addition, if the user sends the message or selects the "check names" command while the e-mail program module is operating in the background, the processes or threads associated with the e-mail program are automatically halted. In addition, if the user attempts to send the message without resolving the ambiguous display names displayed by the e-mail program, the process defaults back to the normal process for resolving names, which displays a dialog box from which the user must choose the correct name.

From the foregoing description of the various features, those skilled in the art will appreciate that the name checking feature of the preferred e-mail program automatically resolves display names while a user composes a message and simplifies the process of manually resolving ambiguous names by providing multiple options for resolving the ambiguities. In addition, the preferred e-mail program automatically creates and maintains a list of nicknames.

The Preferred Method for Providing Message Flags

E-mail messages typically fall into one of three categories: (1) those in which the recipient is asked or instructed to do something; (2) those which prompt the recipient to take some form of action though he or she is not explicitly requested by the sender to do so; and (3) information that requires no follow-up action. Generally, an e-mail recipient will read a message, decide what response is required and either act on that decision immediately or close the message and postpone the required action until later. Although a recipient may know that some form of follow-up action is required, once the message is closed it is often easily overlooked or lost in the clutter of the other messages in the inbox. This is especially likely if the recipient receives a large number of e-mail messages.

The prior art has not provided any convenient or effective way for senders or recipients to flag messages that require follow-up action. An aspect of the present invention allows a user (sender or recipient) to attach a flag, or message flag, to an e-mail message. The message flag clearly identifies the follow-up action (e.g., fax report), or action item, that is required to deal with the message, and may also include a deadline. The message flag and deadline draw the recipient's attention to the main action item associated with the message.

Message flags make it easier for the recipient of e-mail messages to organize and manage his or her inbox. With message flagging, an e-mail recipient may work through his or her inbox and flag messages that require some form of follow-up action. Once the follow-up action is complete, the recipient may mark the message to so indicate the completed state. If an item is flagged with a deadline and has not been marked as complete, the e-mail program will provide an alarm at a predetermined period of time prior to the deadline. Similarly, if an item is marked with a deadline that arrives before the item is marked as complete, the e-mail program will change the display attributes of the overdue item, thus making it readily apparent to the recipient. The messages may also be sorted or grouped according to whether they include message flags, by deadline, or by whether they are marked as completed. These features allow the user to effectively manage the tasks that result from incoming e-mail messages.

Turning now to FIGS. 11-18, the preferred method for providing message flags will now be described. As discussed above, the message flagging features form a part of the preferred application program, which is the "MICROSOFT OUTLOOK" personal information manager, published by Microsoft Corporation. The preferred application program includes a variety of program modules that are tailored to various tasks, including scheduling, electronic mail, task management ("to-do" lists), and contact management. This aspect of the present invention deals primarily with the features of the e-mail program module.

FIG. 11 illustrates the preferred data structure in which data is stored in an e-mail message. Generally, an e-mail message (also referred to as an e-mail item) includes a plurality of properties. Each property is associated with data that represents the value of that property. In most cases, the properties correspond to a field that is displayed by the e-mail program module. For example, most e-mail items include the following properties, which correspond to fields displayed on the e-mail form, as shown in Table 1.

TABLE I

| Property Tag | Value (data) |
| --- | --- |
| Sender | The name of the user that originated the e-mail item |
| Recipient(s) | The name of the recipient(s) of the e-mail item |
| Subject | The subject of the e-mail message |
| Body | The text of the e-mail message |

A user composes an e-mail message by entering values in displayed fields that correspond to the properties. Those skilled in the art will appreciate that most e-mail modules automatically insert the name of the sender in the sender field. When an e-mail message is transmitted to a recipient, its constituent properties and their associated values are transmitted to the recipient via a network.

As illustrated in FIG. 11, the preferred e-mail module uses three additional properties to provide the message flag features. The additional properties include status 1100, message flag 1105, and due date 1110 properties. Each property consists of the property tag and the associated value. The status property 1100 indicates one of three states: (1) there is no flag associated with the message; (2) the e-mail item includes a message flag and is not complete; and (3) the e-mail item includes a message flag and is complete. The message flag property 1105 indicates the action item associated with the message. The due date property 1110 indicates a deadline for completing the action item.

As mentioned above, the preferred application program incorporates the features of MAPI version 1.0. Like other application programming interfaces (APIs), MAPI provides a variety of standardized services that simplify the process of writing code to carry out certain functions. In particular, the MAPI features facilitate the addition of new properties. This is accomplished by calling the appropriate MAPI function, SetProps, and providing the name and value of the new property. The properties are saved as part of the message item. Additional information is available in the MAPI specification.

Figure 12:
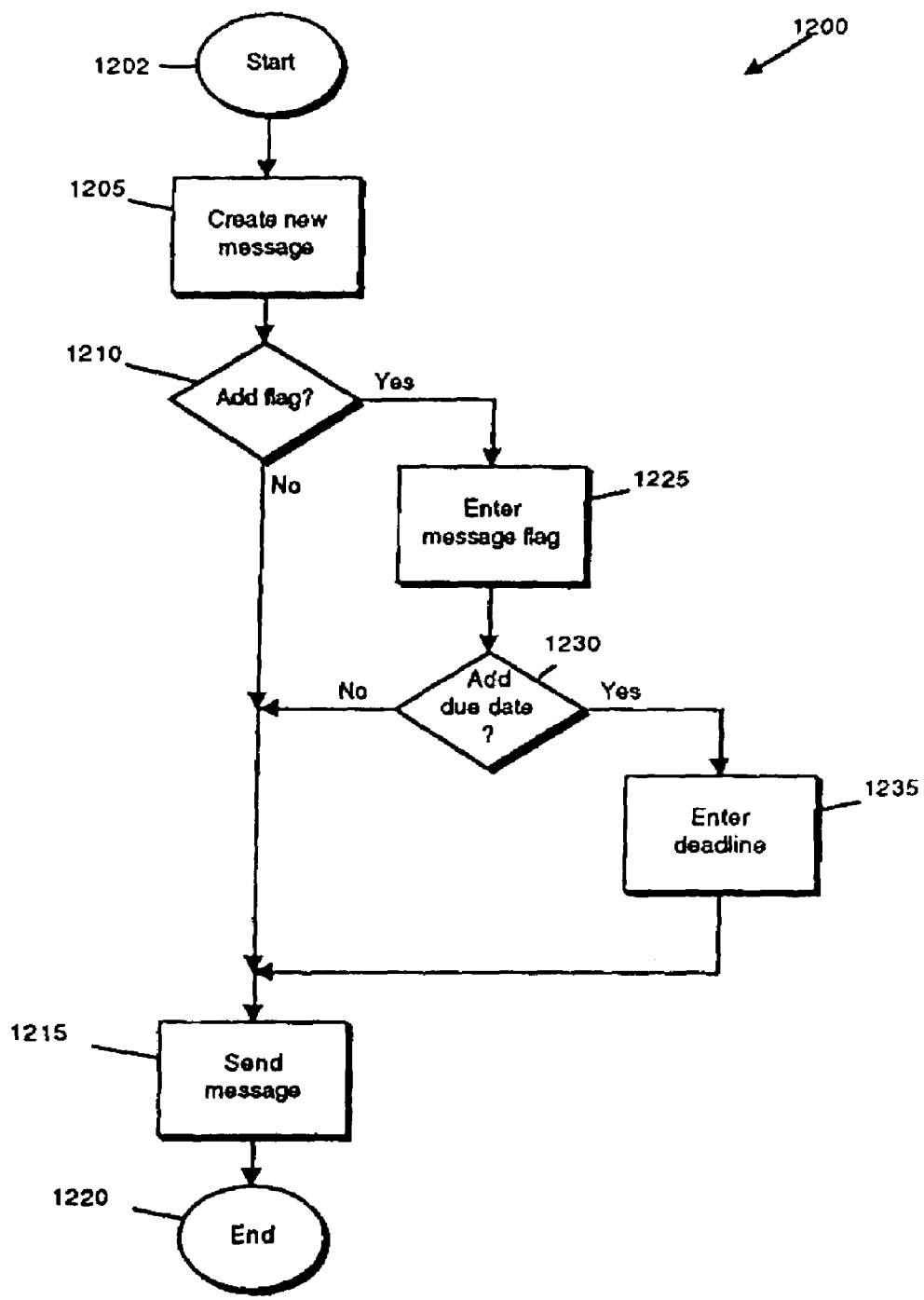
FIG. 12 is a flow diagram illustrating the preferred method for adding a message flag to an e-mail message, as performed by a user.

FIG. 12 is a flow diagram illustrating the preferred steps performed by a user in order to create an e-mail message that includes a message flag. Those skilled in the art will appreciate that although the method 1200 is described primarily in terms of steps carried out by a user, the present invention is a computer-implemented process that is carried out by the computer in response to input from the user and instructions provided by the preferred e-mail program module.

The method 1200 begins at start step 1202 and proceeds to step 1205 when the user decides to create a new e-mail message. At step 1205, the user performs the steps associated with the creation of a conventional e-mail message, including identifying the recipient(s) of the message, entering a subject, and typing the body of the message.

At step 1210 the user decides whether to add a specific action item (message flag) to the message. If not, the "no" branch is followed and the user proceeds to step 1215. At step 1215 the user sends the e-mail message, which includes the conventional types of data. Once the message is sent, the method 1200 ends at step 1220.

If, at step 1210, the user decides to add a specific action item to the message, the "yes" branch is followed to step 1225 where the user enters the message flag. This is accomplished by first selecting a "flag message" command. In the preferred application program, this causes the computer to display a dialog box that provides a field for the user to enter the action item (i.e., the flag) and a due date, if one is desired. When entering the message flag, the user may type the flag, or select from a list of common actions items that are displayed in the dialog box. These items include entries such as call, follow-up, forward, read, reply, etc. The list also includes entries such as "for your information" and "no response necessary" if the user wants to make it clear to the recipient that no response is expected.

After the user has entered the flag at step 1225 the user proceeds to step 1230 and determines whether to add a due date to the message. If not, the "no" branch is followed to step 1215 where the user sends the message. If the user wants to add a due date, the "yes" branch is follows to step 1235 where the user enters the deadline, which includes a date, and may also include a time. After the user enters the due date at step 1235 the user goes to step 1215 and sends the message.

Figure 13:
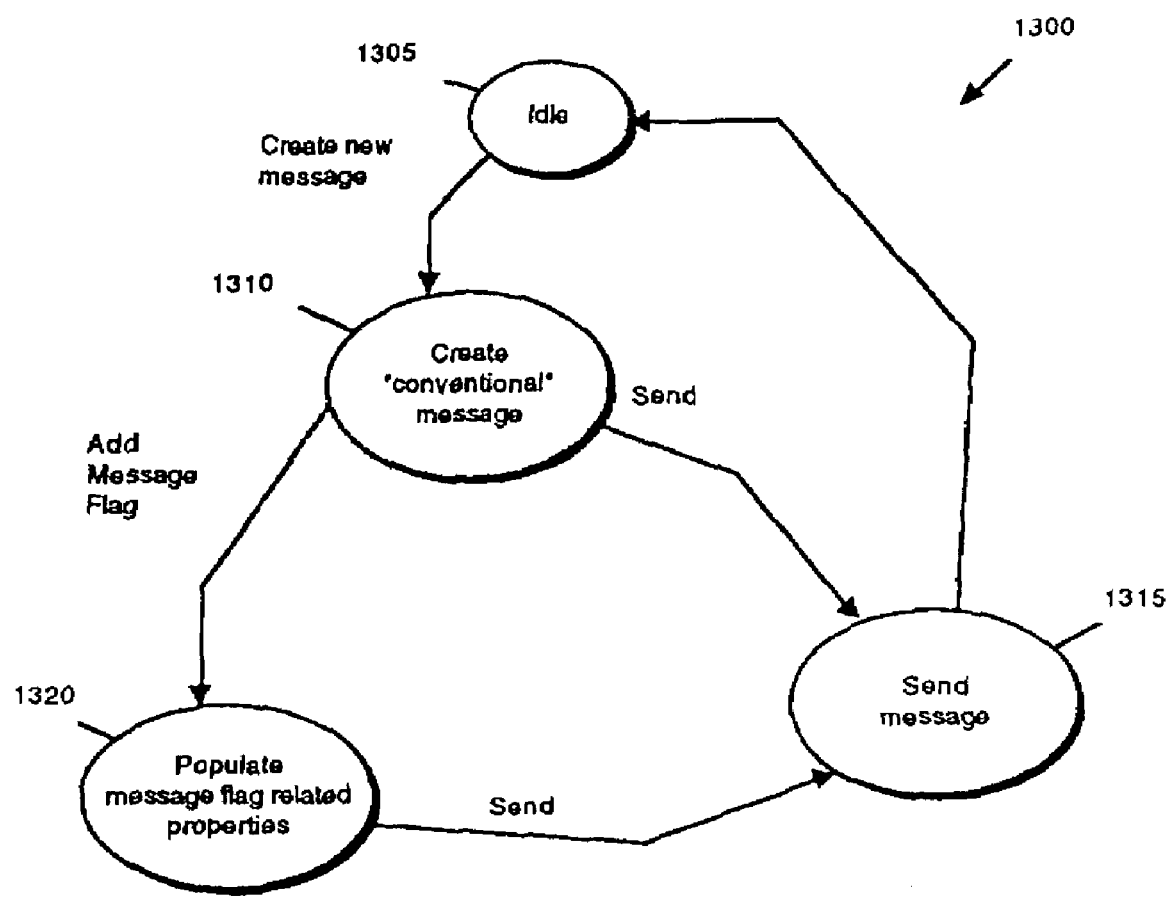
FIG. 13 is a state diagram illustrating the preferred method for adding a message flag to an e-mail item, as performed by a computer.

FIG. 13 is a state diagram illustrating the preferred process performed by a computer that is being used to create an e-mail message that includes message flags. Although the method 1300 is described in terms of tasks carried out by a computer, those skilled in the art will appreciate that the present invention is a computer-implemented process that is carried out by the computer in response to input from the user and instructions provided by the preferred e-mail program module.

The method 1300 begins at state 1305 with the computer in an idle state as it relates to instructions provided by the e-mail program module. When the user selects the command for creating a new message, the computer proceeds to state 1310, where it receives the information that is typically associated with a conventional e-mail message. As mentioned above, this includes receiving data indicative of the recipient(s), subject, priority, and body, and storing this data in association with the corresponding properties that constitute the e-mail message item. If the user then selects the "send" command, the computer goes to state 1315 and transmits the e-mail message item. Those skilled in the art will understand that this may be accomplished by calling the MAPISendMail and SubmitMessage functions, which carry out the specific steps necessary to send an e-mail message item, including all of the constituent properties and associated data. After the message is sent, the computer returns to the idle state 1305.

Referring again to state 1310, if the user selects the "flag message" command, the computer proceeds to state 1320. At state 1320 the computer receives the message flag data and due date data (if provided) from the user and stores it in association with the corresponding e-mail message properties. As described earlier, the preferred e-mail program provides message flags by adding three properties to the e-mail message item. These include the status, message flag, and due date properties, which were discussed in conjunction with FIG. 11. When the message flag is added at state 1320, the action item entered by the user is stored with the message flag property and the deadline, if any, is stored with the due date property. In the preferred e-mail system, the default value for the flag is "follow-up" and for the due date is "none." When the message flag is entered, the computer alters the status property to indicate that the message item includes a message flag and that the item is not yet completed. The data associated with the status property typically is not displayed to the sender. When the user then selects the "send" command, the computer goes to state 1315 and transmits the e-mail message item in the manner described above. From there, the computer returns to the idle state 1305.

Figure 15:
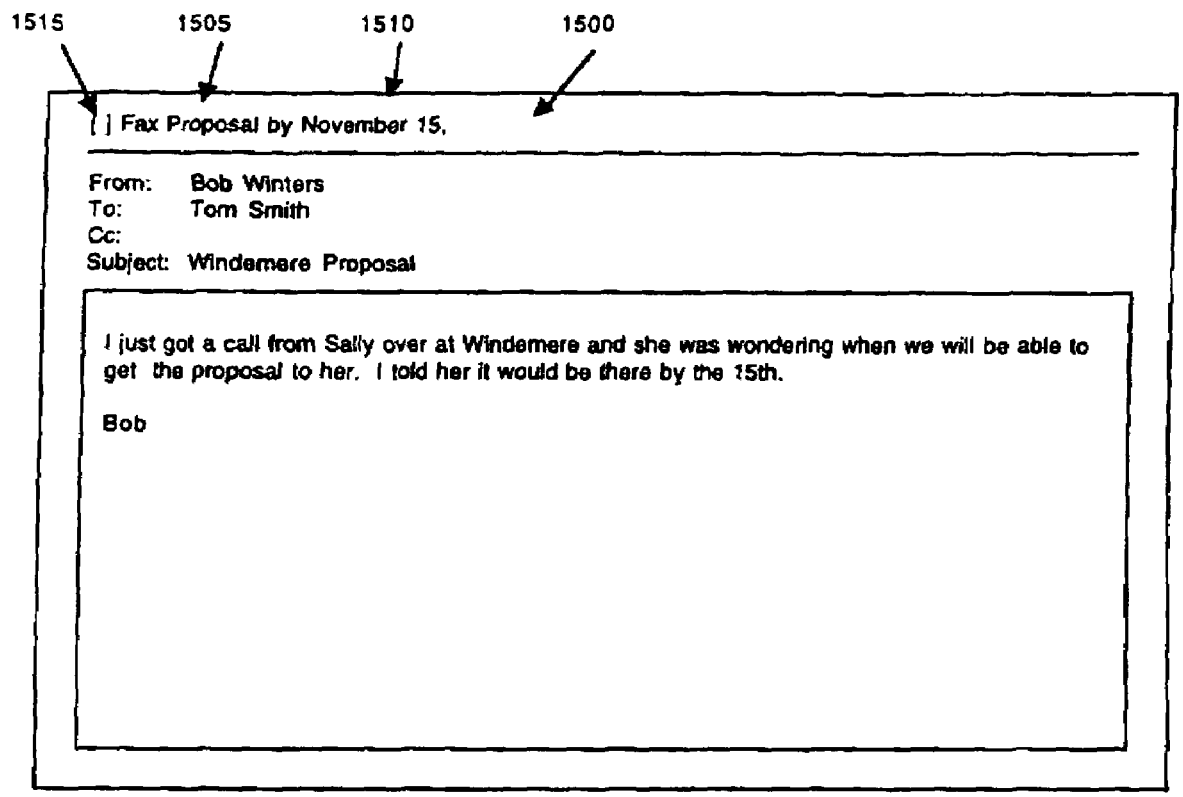
FIG. 15 is an illustration of a screen display of a message view of an e-mail message including a message flag in accordance with the preferred embodiment of the present invention.

FIGS. 14 and 15 illustrate the information that is displayed to a recipient of e-mail messages that include message flags. FIG. 14 illustrates a "list view" of e-mail messages received by a user of the preferred e-mail program. The list view is suitable for displaying a list of the messages in a user's inbox. FIG. 15 illustrates the message view, which displays the complete content of a message that has been opened by the user of the preferred e-mail program.

FIG. 14 illustrates a default list view 1400, which adds a "status" column 1405 to the information typically displayed by prior art e-mail programs. The "status" column 1405 indicates whether each e-mail message item includes a message flag and whether the action item has been marked by the recipient as being complete. In FIG. 14, the message items that include a message flag are marked with either a "—" or a "√." The "√" indicates that the recipient has marked the item as being complete. The "—" indicates that the item has not been completed. In another embodiment, the "—" and "√" icons are replaced with red and white flags. Messages without a message flag do not include any mark in the "status" column. In the preferred application program, the list view may be altered to display other combinations of information, such as the content of the message flag.

FIG. 15 illustrates the information that is displayed in the message view for the preferred e-mail program. This view is used to display the complete content of an e-mail message item. The message view is displayed after a user opens an e-mail message from the list view (FIG. 14). In the message view, the preferred application program displays the data that is associated with prior art messages, including the sender, the recipient(s), the subject, and the body of the message. The date and time that the message was completed may also be displayed. In addition, messages that include message flags are displayed with an alert line 1500, which includes the text of the message flag 1505 and the due date 1510 (if any). In addition, the alert line 1500 includes a check box 1515 that indicates whether the action item is complete. When the message is first opened, this box is not checked. The user may click on the box to indicate that the associated action item has been completed.

Figure 16:
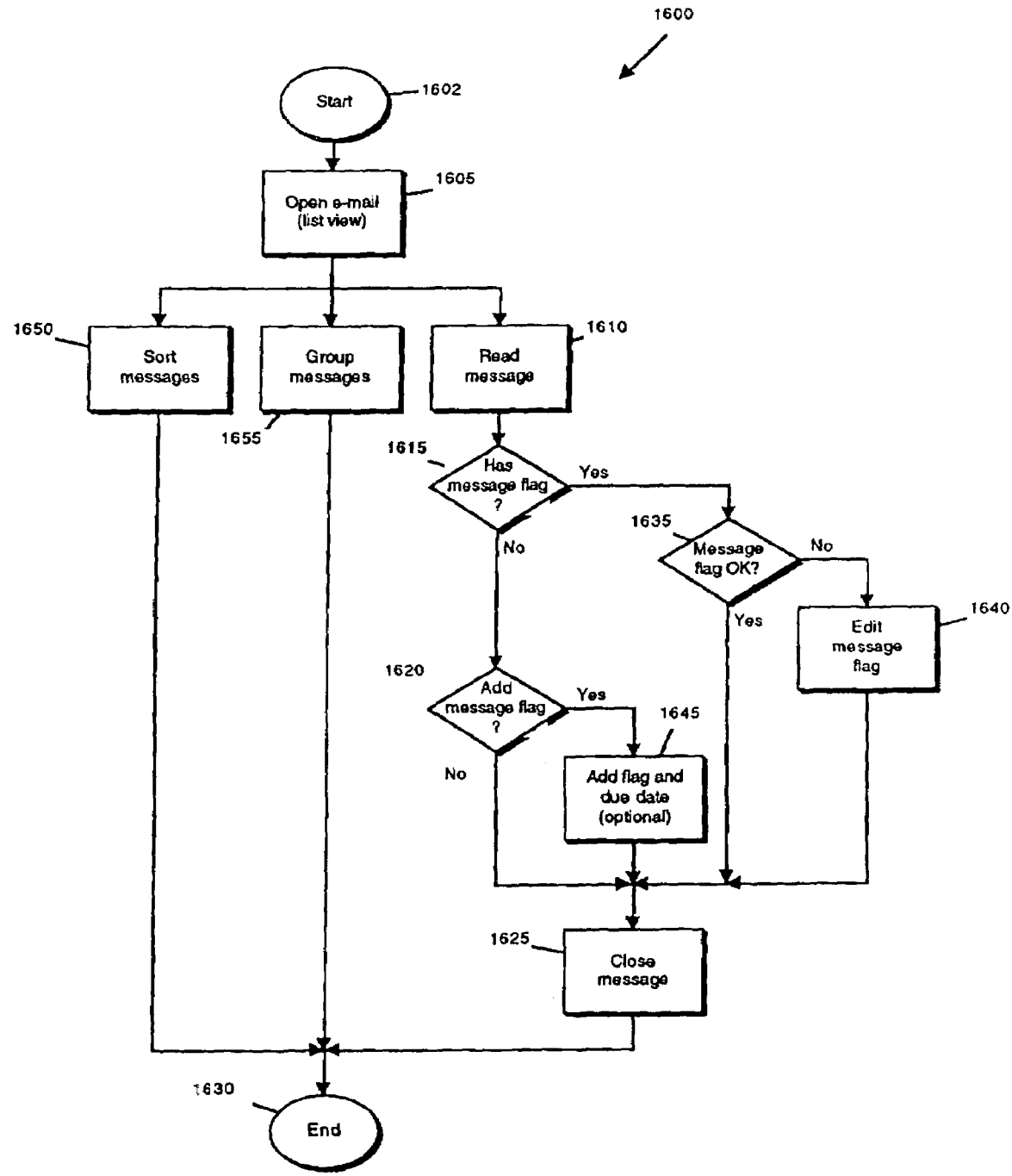
FIG. 16 is a flow diagram illustrating the preferred method for reviewing and editing an e-mail message, as performed by the user.

FIG. 16 is a flow diagram that illustrates the steps that may be performed by the recipient of e-mail messages. As mentioned above, the present invention is a computer implemented process that is carried out by the computer in response to input from the user and instructions provided by the e-mail program.

As discussed earlier, in the context of message flagging, the recipient has several options regarding a response to e-mail message items. Those skilled in the art will appreciate that the options discussed in conjunction with FIG. 16 are provided in addition to conventional options, such as deleting, replying to, and forwarding a message. Generally described, the recipient of e-mail messages may read messages, add or alter message flags, and sort and group messages based on specified properties.

The method 1600 begins at start step 1602 and proceeds to step 1605 when the user opens the e-mail program module and reviews the items in his or her inbox, which are displayed in the list view (FIG. 14). At that point, the user may decide to read a message or to take some other action. If the user decides to read one of the messages, the user goes to step 1610 and opens the selected message. In the preferred program, a message may be opened by double clicking on the selected message or by selecting the message and invoking the read command.

Once the user has read the message the user goes to step 1615 and determines whether the message includes a message flag. If not, the user goes to step 1620 and decides whether to add a message flag, which would be appropriate if the user decides some follow-up action is required. If the user is satisfied that the message does not need a message flag, the user closes the message (step 1625). The method 1600 terminates at step 1630.

If, at step 1615, the user sees that the message includes a message flag, the user goes to step 1635 and determines whether the action item and due date (if any) associated with the message flag are satisfactory. If so, the user goes to step 1625 and closes the message. If the message flag and due date are not satisfactory, the user goes to step 1640 and edits the information. For example, if the message flag and deadline indicate that a task must be completed by Friday, but the user will be out of the office on Friday, the user may edit the due date data to indicate that the task must be complete by Thursday at 5:00 p.m. Similarly, the user can edit the message to indicate that a task has been completed. After the message flag is edited, the user goes to step 1625 and closes the message.

Returning now to step 1620, if the user decides to add a message flag to a message that does not include one, the user goes to step 1645. At that point, the user selects the appropriate command and adds the message flag and, if desired, due date information. This information is stored in association with the corresponding message item properties and becomes part of the message item. Once the message flag is added, the user goes to step 1625 and closes the message.

Returning now to step 1605, the user may also decide to performs steps to organize or manage his or her inbox. For example, the user may choose to sort messages by going to step 1650. As in prior art e-mail programs, the program rearranges the e-mail messages in the list view according to the values in one or more of the selected properties. For example, the user may sort the message by date received, by whether they are complete, etc. The method 1600 then terminates at step 1630.

From step 1605 the user may also decide to group the messages according to the values associated with certain properties. Grouping differs from sorting because grouped messages are displayed in groups with dividers or separators between them. At step 1655, messages may be grouped according to whether they require follow-up, the type of follow-up required, and the due date. The method 1600 then terminates at step 1630.

Figure 17:
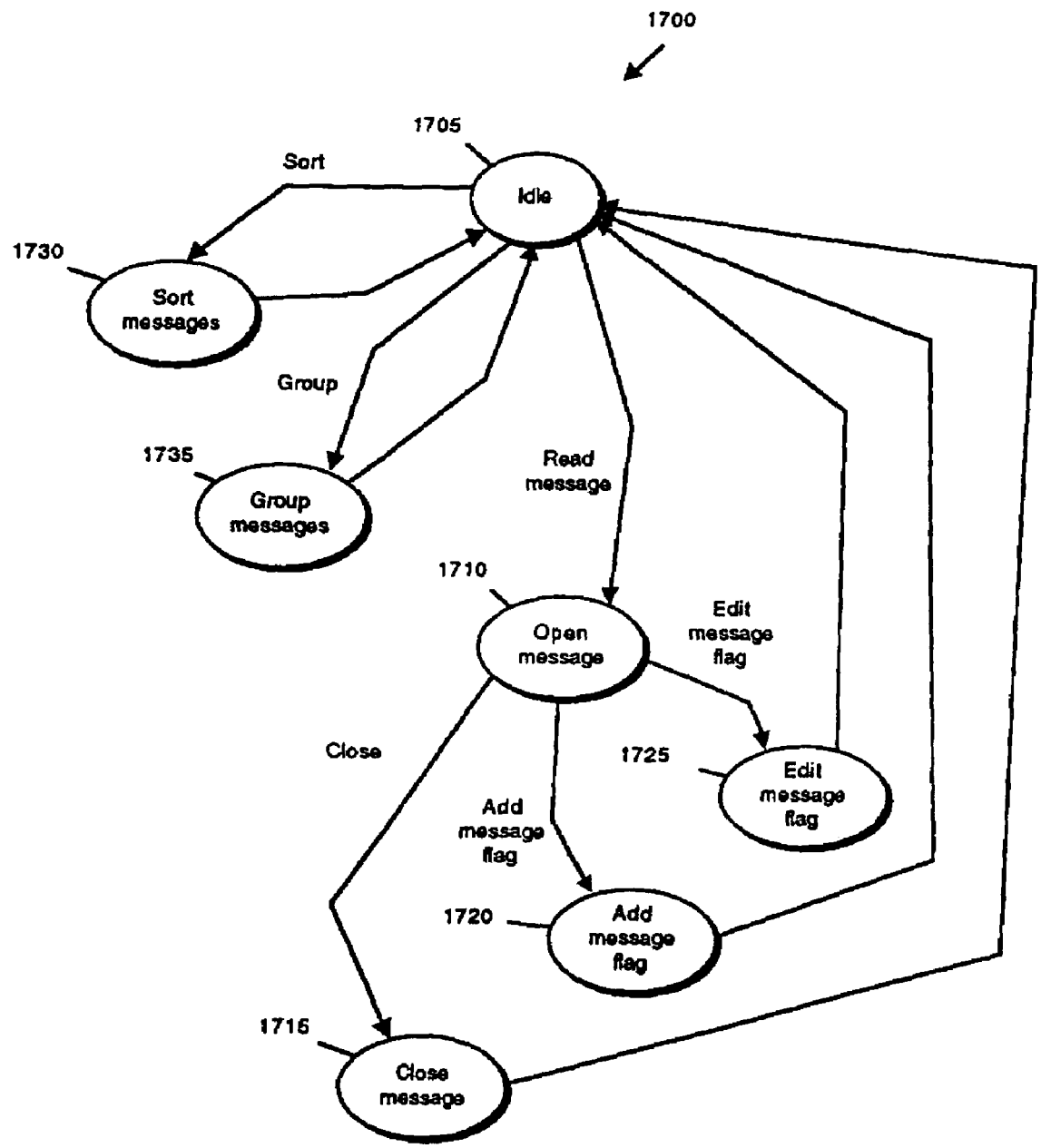
FIG. 17 is a state diagram illustrating the preferred method for reviewing and editing an e-mail message, as performed by a computer.

FIG. 17 is a state diagram illustrating the preferred tasks performed by the computer in response to decisions made by the user, as described with respect to the flow diagram of FIG. 16. Those skilled in the art will understand that the computer is operative to carry out the method 1700 in response to various inputs provided by the user. The method 1700 begins at state 1705 with the program in the idle state.

If the user invokes an "open message" command, the computer goes to state 1710 and opens the selected message. This allows the user to read the entire content of the message item. From there, the computer will do one of several things based on input from the user. If the user invokes the "close message" command, the computer goes to state 1715, closes the message. From there, the computer returns to the idle state 1705.

If, at state 1710, the user invokes the add message flag command, the computer goes to state 1720, where it receives message flag and due date data from the user and stores the data in association with the corresponding properties that constitute the message item. From there, the computer returns to the idle state 1705.

If, at state 1710, the user invokes the edit message flag command, the computer goes to state 1725, where it receives revised message flag and due date data from the user and stores the revised data in association with the corresponding properties that constitute the message item. From there, the computer returns to the idle state 1705.

As discussed in conjunction with FIG. 16, the user may decide to sort or group the messages in the inbox. Referring again to the idle state 1705, the computer proceeds to state 1730 if the user invokes the sort command and to state 1735 if the user invokes the group command. As mentioned above, the computer sorts messages by rearranging the order in which they are displayed in the list view. The order is determined according to the values of one or more of the properties selected by the user. For example, the user may sort the message by date received, by whether they are complete, etc. Those skilled in the art will appreciate that the sort function may be performed by calling the appropriate MAPI function, SortTable. Similarly, when messages are grouped, they are displayed in groups with dividers or separators between them. Messages may be grouped according to whether they require follow-up, the type of follow-up required, and the due date. Those skilled in the art will appreciate that the group function may be performed by calling the appropriate MAPI function, SortTable. After the computer groups or sorts messages, the computer returns to the idle state 1705.

Figure 18:
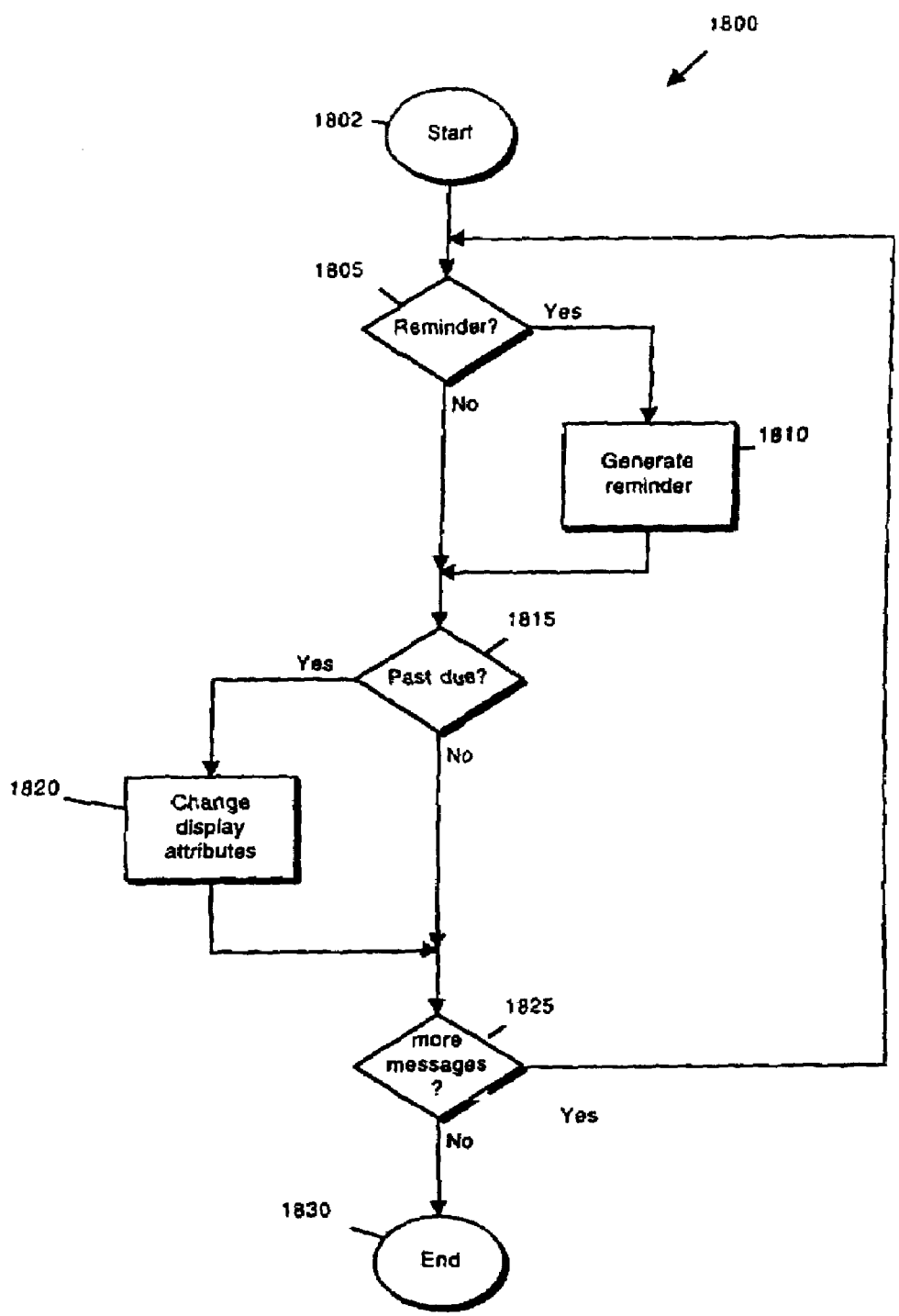
FIG. 18 is a flow diagram illustrating the preferred method for generating reminders and past due indicia associated with e-mail messages that include message flags.

FIG. 18 is a flow diagram illustrating the preferred process for using message flags and deadline data for generating reminders for the user. These steps are carried out by the computer in response to instructions provided by the e-mail program. In one aspect, the method displays a reminder at a predetermined period of time prior to the due date. In another aspect, the method changes the display attributes of a message item in order to indicate that the due date is past. Those skilled in the art will appreciate that these functions are performed by comparing the due date data for each message to the current time. In the preferred e-mail program, this comparison is performed at various, predetermined times. For example, the comparison is made when a message is opened, at a predetermined time (e.g. midnight), and when a list view is redrawn, such as when a new message is received or the user opens a folder that contains messages.

At the times described above, the computer 1800 examines each message and determines whether the due date data indicates that a reminder is needed or that the action item is past due. The process begins at start step 1802 and proceeds to step 1805, where the computer determines whether the first message requires a reminder. This is accomplished by comparing the due date data from the first message with the current time. If the due date data is within a predetermined time period (e.g., 2 days) of the current time, the computer goes to step 1810 and generates a reminder message, which is displayed to the user. After the reminder is displayed, or if no reminder is required, the computer proceeds to step 1815.

At step 1815 the method determines whether the due date is past due. This is accomplished by comparing the due date data to the current time. If the item is past due, the method goes to step 1820 and changes the display attributes of the past due message item. For example, in the list view (FIG. 14), past due items may be displayed in red. After the display attributes are altered, or if the item is not past due, the method proceeds to step 1825.

At step 1825, the method determines whether the inbox or folder includes other messages that need to be checked. If so, the method returns to step 1805 and checks the due date of the next message. If not, the method terminates at step 1830.

From the foregoing description of the various features, those skilled in the art will appreciate that message flagging facilitates communication between the sender and recipient of e-mail messages and facilitates the recipient's organization and management of e-mail messages. This is accomplished by allowing a sender to clearly indicate a follow-up action and a due date. The recipient is able to clearly identify those messages that require some type of follow-up action and the deadline for that follow-up. Furthermore, the invention provides reminders of upcoming due dates and an indication that an item is past due.

In summary, the present invention benefits an e-mail sender by allowing him or her to provide a separate message flag and due date regarding follow-up actions associated with a message. The present invention benefits recipients by allowing a recipient to determine the status of a message and to edit the message flags. Furthermore, the present invention helps the recipient organize his or her inbox by providing sorting and grouping functions. Project management is also facilitated by the provision of reminders and past due notification.

The Preferred Method for Utilizing Custom Forms

As described above, in the MAPI environment, a form provides a template that is used to display the contents of an e-mail message. For example, an e-mail message typically includes an address field, a "From" field, a "Subject" field, and a "Body" field. The user composes an e-mail message by entering data into the appropriate fields and then sends the message to the recipient. For example, a user may enter "Lunch" in the "Subject" field and enter "Where would you like to eat?" in the "Body" field. The form allows the sender and recipient of an e-mail message to view the fields and data entered into those fields. A form contains layout information that specifies the layout, or arrangement, of the fields.

As previously discussed, there are times when a user feels that available forms simply do not meet his or her requirements and that it would be useful to create a custom form that allows the viewing of additional fields. A custom form is one in which the user has added fields, deleted fields, and/or rearranged fields to suit a particular need. As those skilled in the art will understand, several prior application programs allow users to create custom forms. These programs include the forms design utility in the "MICROSOFT EXCHANGE" program published by Microsoft Corporation, the "LOTUS NOTES" groupware message application program published Lotus Development Corporation, and the "JETFORM FOR E-MAIL" program published by JetForm Corporation.

In the prior art, after the creation of a custom form, the custom form is typically "published," or stored on a central file server. Each user was then required to install the form on their computer. Before using the custom form, all users, both users sending a message item containing the custom form and users receiving a message item containing the custom form, had to install the custom form on their operating system. Thus, the prior art has not provided a convenient method for users to quickly create a custom form and to send and receive a custom form.

Figure 19:
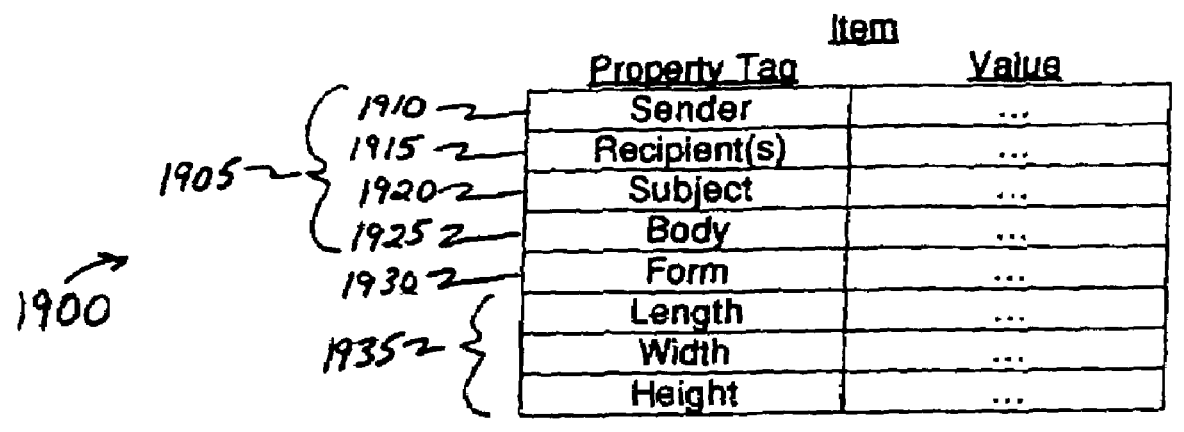

As mentioned earlier, an e-mail message, or e-mail item, includes a plurality of properties. Each property includes a property tag and value, which are stored together in system memory 15 (FIG. 1) as a single data structure. In most cases, the properties correspond to a field that is displayed. FIG. 19 illustrates an e-mail message item 1900 that includes a plurality of properties. These include the standard properties 1905, such as a "sender" property 1910, a "recipient(s)" property 1915, a "subject" property 1920 and a "body" property 1925.

The preferred e-mail module uses an additional property to provide a method and system for creating a message item that uses a custom form. Generally described, a description of the custom form is stored in a property of the e-mail message, and is transmitted to the recipient as part of the message. This eliminates the need for the form to be installed on the recipient's computer prior to receiving the new message.

In the preferred e-mail system, an existing form, or standard form, can be modified by the user by rearranging fields and adding new fields, if necessary, to create the layout of fields desired by the user. The modified form is referred to as a custom form. As illustrated in FIG. 19, in the preferred embodiment, a value corresponding to the layout information of the custom form and a "form" property tag are stored together as a "form" property 1930 in the e-mail item 1900. The "form" property is sent to the recipient with other properties of the mail item. The value stored in the form property 1930 contains layout information for the standard properties 1905 and the custom properties 1935. The standard properties correspond to the fields that were included in the standard form. The custom properties correspond to the fields that were added by the user when customizing the standard form. In contrast to the prior art, the preferred embodiment does not require that the form be previously "published" or that the user or the recipient install the form in a memory device before sending or receiving a message item that uses the form.

When a recipient receives an e-mail message, it is determined whether the message item has a "form" property. If the message item includes a "form" property, then the value in the "form" property is read to extract layout information. The layout information is used to display the message item, including the fields, in the proper placement and arrangement.

Preferably, the creation of a custom form is accomplished using the preferred application program, which is the "MICROSOFT OUTLOOK" personal information manager. Thus, the following description of the creation of a custom form is given with reference to the commands and steps executed when creating a form using the "MICROSOFT OUTLOOK" personal information manager.

Figure 20:
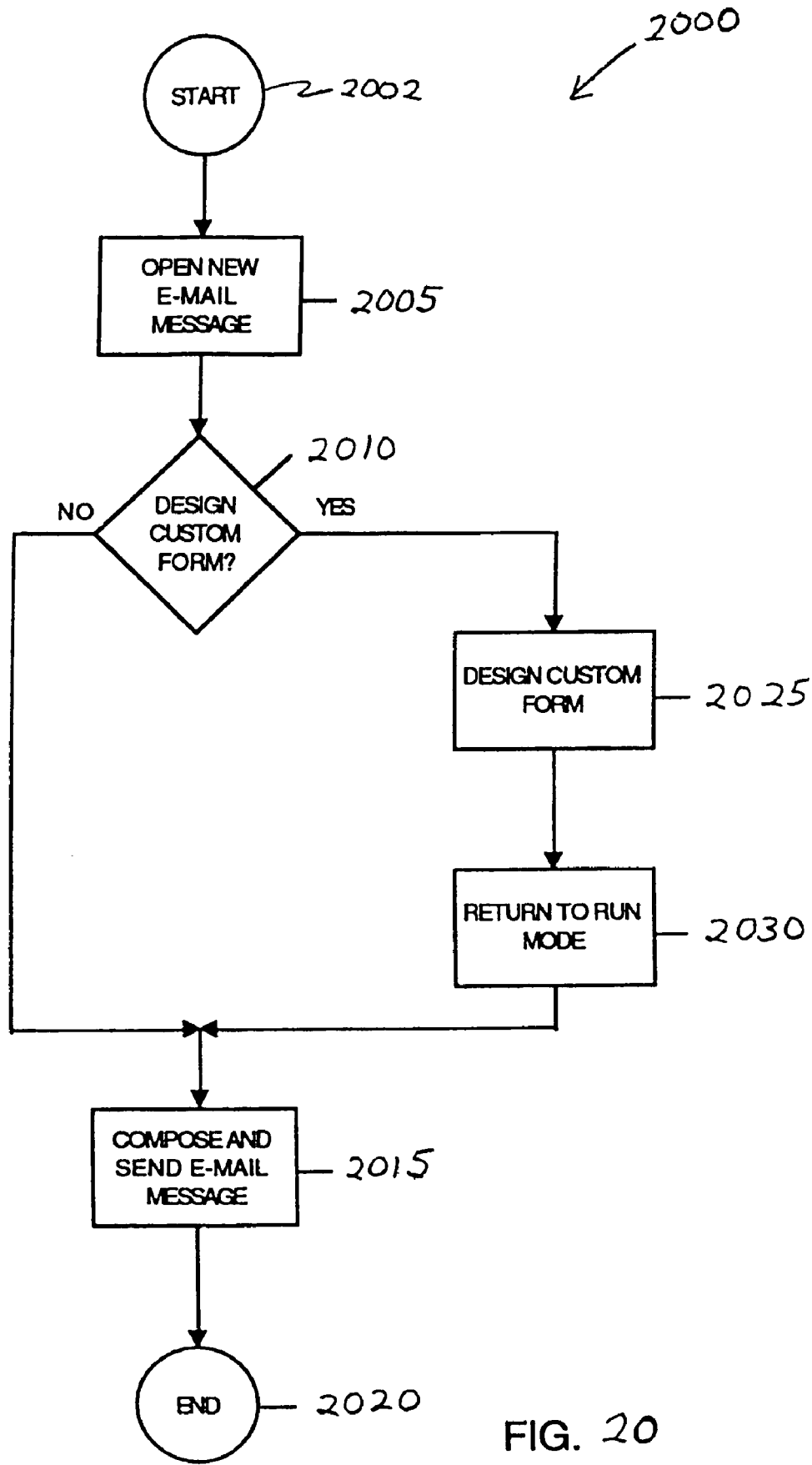
FIG. 20 is a flow diagram illustrating the preferred method for creating and sending an e-mail message that uses a custom form, as performed by a user.

FIG. 20 is a flowchart, from the sender's perspective, of the steps performed in creating and sending an e-mail message that uses a custom form. Although the method is described below in the context of a user executing certain steps and a computer performing certain steps, those skilled in the art will understand that the present invention is a computer-implemented process carried out by a computer in response to both user input and instructions from an e-mail program module.

The method 2000 begins at the start step 2002 and proceeds to step 2005 when the user opens a new e-mail message. As those skilled in the art will understand, the new message will be displayed using a previously installed form, or standard form. A standard form supplied by MAPI includes fields such as an address field, a "From" field, a "Subject" field, and a "Body" field that are commonly used in a message.

At step 2010, the user decides whether to use one of the previously installed forms or to create a custom form for the e-mail message. If the user decides to use a previously installed form, the user proceeds to step 2015 and composes the e-mail message. In other words, at step 2015, the user performs the steps associated with the creation of a conventional e-mail message, including identifying the recipient(s) of the message, entering a subject, and typing in the text of the message. After the user has composed the message, then the user sends the message. Once the message is sent, the method 2000 ends at step 2020.

Figure 21:
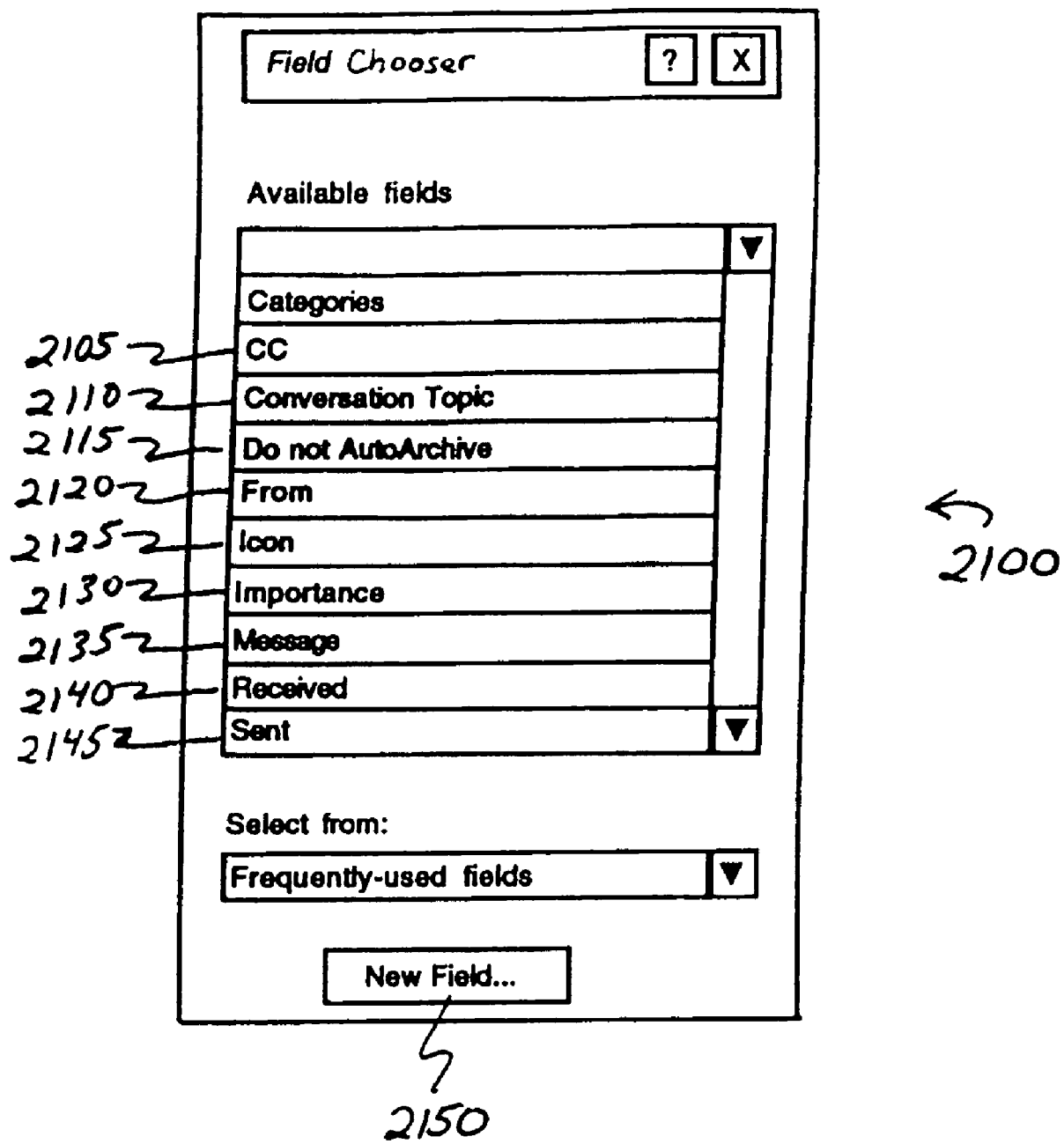
FIG. 21 is an illustration of a field chooser dialog box in accordance with the preferred embodiment of the present invention.

If, at step 2010, the user decides to design a custom form for the message, the user proceeds to step 2025 and customizes the form, or designs the custom form. This is accomplished by first selecting a "design forms" option. In the preferred application program, selecting the "design forms" option shifts the application program into design mode. When the preferred application is in design mode, a dialog box known as a field chooser is displayed. The field chooser 2100, which is shown in FIG. 21, is a dialog box that provides a list of fields that the user may add to the displayed form. For example, a field chooser may contain a list of fields such as "Cc" 2105, "Conversation Topic" 2110, "Do not Auto Archive" 2115, "From" 2120, "Icon" 2125, "Importance" 2130, "Message" 2135, "Received" 2140, and "Sent" 2145.

When customizing a form, the user selects a field from the field chooser 2100 and adds this field to the form. The field chooser also provides an option that allows a user to create a new field, if the fields listed in the field chooser do not meet the needs of the user. The user preferably creates a new field by selecting the "new field" option 2150 in the field chooser. Then, the user enters a name, type, and format for the new field. After the new field is created, the preferred application program adds the new field to the field chooser. Then, the user can select the new field from the field chooser and add it to the standard form. It will be understood by those skilled in the art that any previously installed form can be customized using the method outlined above.

Referring again to FIG. 20, after the user has designed the form at step 2025, the user proceeds to step 2030 and returns the application program to run mode. This is accomplished by selecting a "run mode" command.

After returning the application program to run mode, the user composes and sends the message at step 2015 as described above. The method then ends at step 2020.

Figure 22:
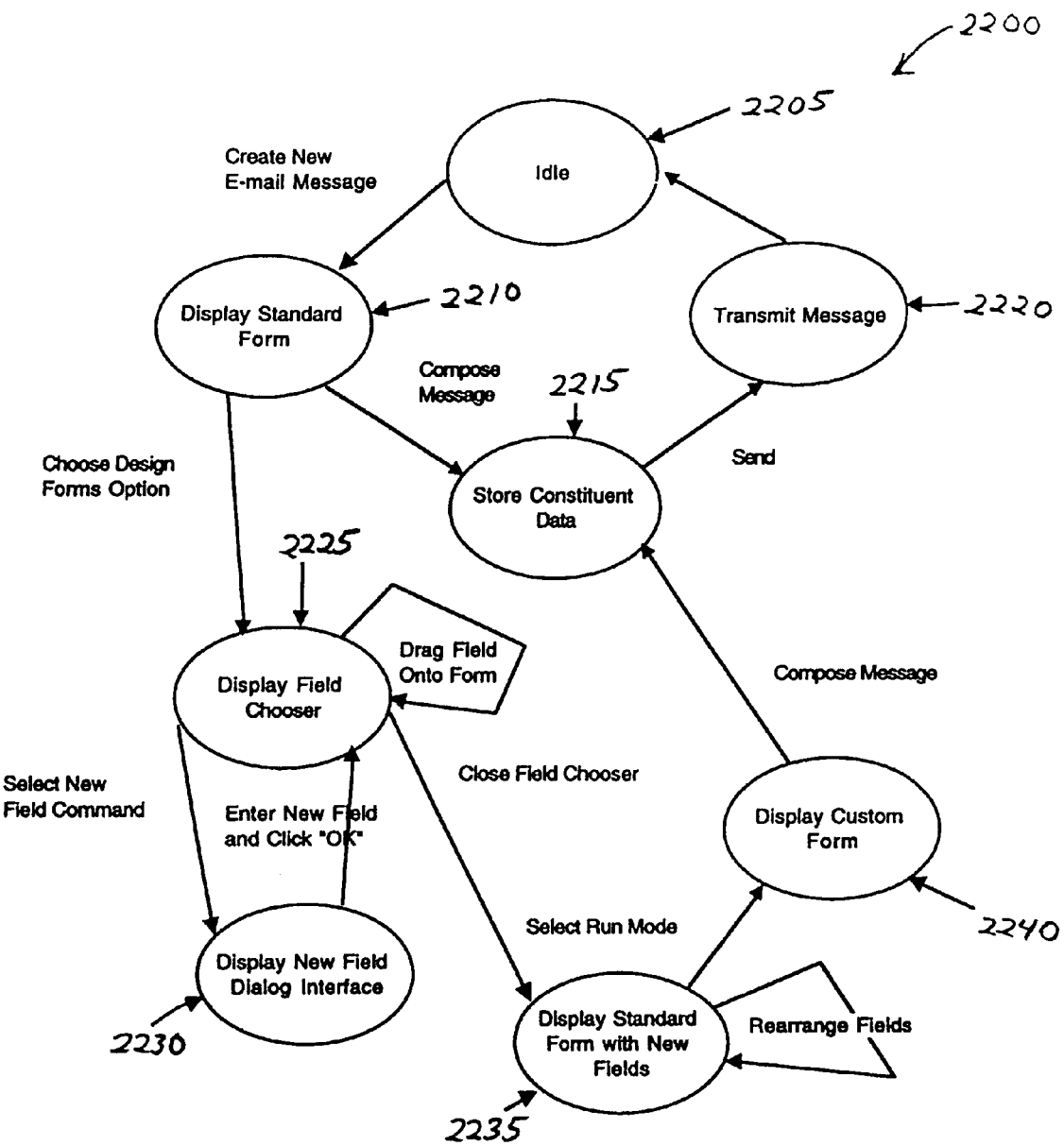
FIG. 22 is a state diagram illustrating the preferred method for creating and sending an e-mail message that uses a custom form, as performed by the computer.

FIG. 22 is a state diagram illustrating the functions performed by a computer that is being used to create an e-mail message that uses a custom form. The method 2200 begins at state 2205 with the computer in an idle state as it relates to instructions provided by the e-mail program module. When the user selects the command for creating a new message, the computer proceeds to step 2210, where it displays the standard form for an e-mail message. The standard form includes fields to enter data or compose the message. If the user enters data for one or more of these fields, the computer goes to state 2215 and stores the constituent data in properties of the e-mail item corresponding to these fields. When the user selects the "send" command, then the computer goes to state 2220 and transmits the e-mail message item. After the message is transmitted, the computer returns to the idle state 2205.

Referring again to state 2210, if the user chooses the "design forms" command, the computer proceeds to state 2225. At state 2225, the computer shifts the preferred e-mail program module from run mode to design mode. In design mode, the user may customize, or edit, the displayed form by adding and/or rearranging fields. When the user selects the "design forms" option, the computer also displays a field chooser dialog box at state 2225.

If the user selects a field from the field chooser dialog box to be added to the standard form, then the user drags the field off of the field chooser dialog box and onto the custom form. The user "drags" the field off of the field chooser dialog box using a mouse 29 (FIG. 1) or similar input device. The computer adds the field to the displayed form and continues to display the field chooser dialog box at state 2225.

If the user selects the "new field" command, the computer proceeds to state 2230. At state 2230, the computer displays a new field dialog interface. The new field dialog interface includes blanks to enter the name, type, and format of the new field. A toolbox is also displayed. The toolbox has buttons corresponding to different tools that can also be used to create new fields on the form. For instance, the user can select the radio button tool from the toolbox and create a new radio button on the form. After the user enters the name, type, and format of the new field or adds a field using the toolbox then the user selects the "OK" command. After the user selects the "OK" command, the computer returns to state 2225. As described above, at state 2225, the computer displays a field chooser dialog box. After the user has added a new field, the computer will display the field chooser dialog box including the new field that was added.

Referring again to state 2225, if the user is finished adding fields, then the user closes the field chooser dialog box. When the field chooser is closed, the computer proceeds to state 2235. At state 2235, the computer displays the standard form and the new fields that have been added to the standard form. The user can rearrange the fields until the fields are in the location and position desired by the user. When the user has finished rearranging the fields, the user selects a command to return to run mode and the computer proceeds to state 2240. At state 2240, the computer displays the custom form, that is, the standard form with added fields, with the fields in the position determined by the user. In run mode, the user may enter data corresponding to the fields of the custom form, but may not rearrange fields or add and delete fields as can be accomplished in design mode.

If the user composes the message, i.e. enters data corresponding to one or more fields of the custom form, the computer proceeds to state 2215 and the data entered into the fields is stored in the properties corresponding to the fields. When the user selects the send command, the computer proceeds to state 2220 and transmits the e-mail item. After the message is sent, the computer returns to the idle state 2205.

Figure 23:
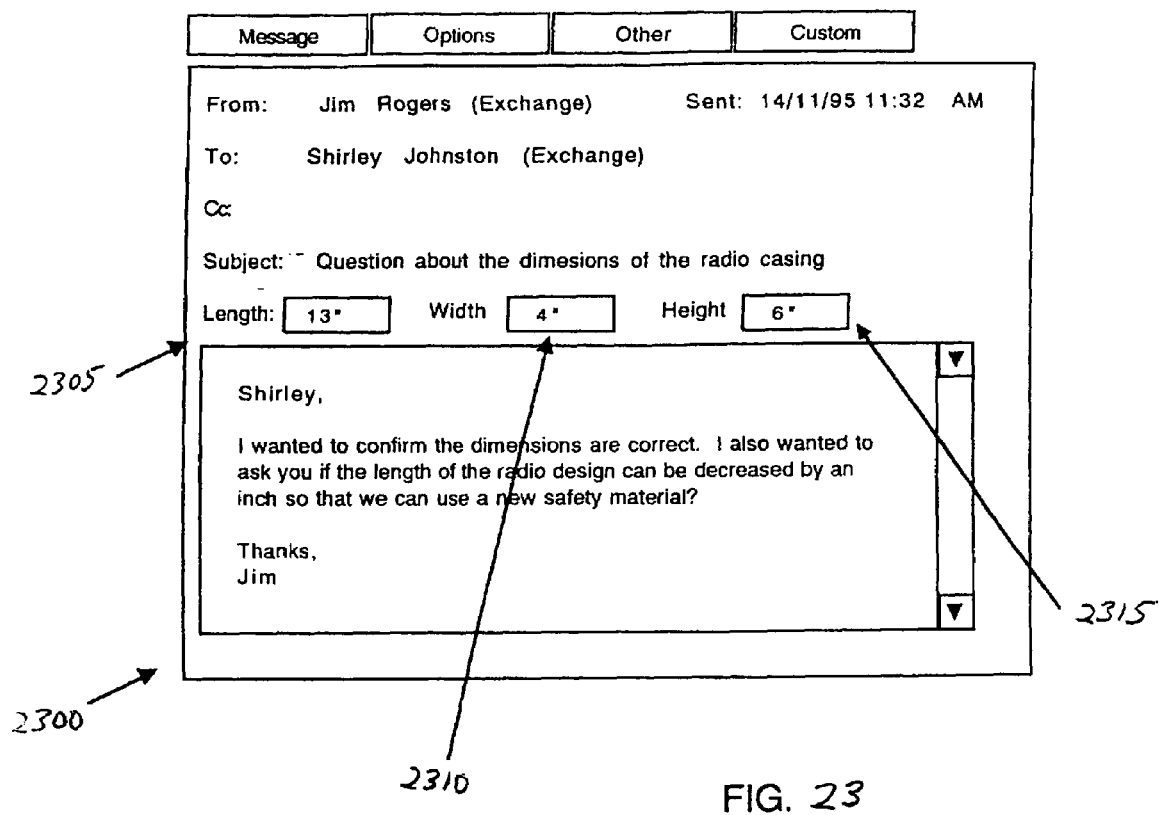
FIG. 23 is an example of a screen display that is displayed to the sender of an e-mail message that uses a custom form in accordance with the preferred embodiment of the present invention.

FIG. 23 is a representative example of the user interface that is displayed by the preferred e-mail program module to the sender of an e-mail message that uses a custom form. The e-mail message 2300 includes three fields that have been added by the sender of the message. These fields are a "Length" field 2305, a "Width" field 2310, and a "Height" field 2315. It will be understood that these fields have been added to a conventional e-mail message in accordance with the preferred e-mail system. The present invention is not limited to the addition of these fields to an e-mail message, but can be extended to the addition of more (or fewer) custom fields. In addition, the present invention may be used to simply rearrange the fields of a conventional e-mail message without adding any fields. Those skilled in the art will appreciate that the data entered in these fields is stored as a value in the corresponding properties of the e-mail message item (FIG. 19).

Thus, from the foregoing description, it will be obvious to those skilled in the art that the present invention provides a method for creating and sending an e-mail message that includes a custom form. The data corresponding to the custom form is stored in a property of the e-mail message item along with the other properties of the message. The custom form does not need to be installed on a memory storage device or stored in a form registry provider 500 (FIG. 5) before being used.

Having described the method for creating and sending an e-mail message that includes a custom form, a description of the method for receiving a message with a custom form will now be presented. When the preferred e-mail program module is used to open a message that has been received, the module determines whether the message item has a "form" property. If the message item has a "form" property, the layout information, stored as a value in the "form" property, is read and used to view the contents of the e-mail message. If the message item does not have a "form" property, then the layout information is read from the MAPI form registry provider 500 (FIG. 5) and the message item is displayed. The only action performed by a recipient is to open the e-mail message. The e-mail program module will determine where to find the form and will extract the layout information from the appropriate source.

Figure 24:
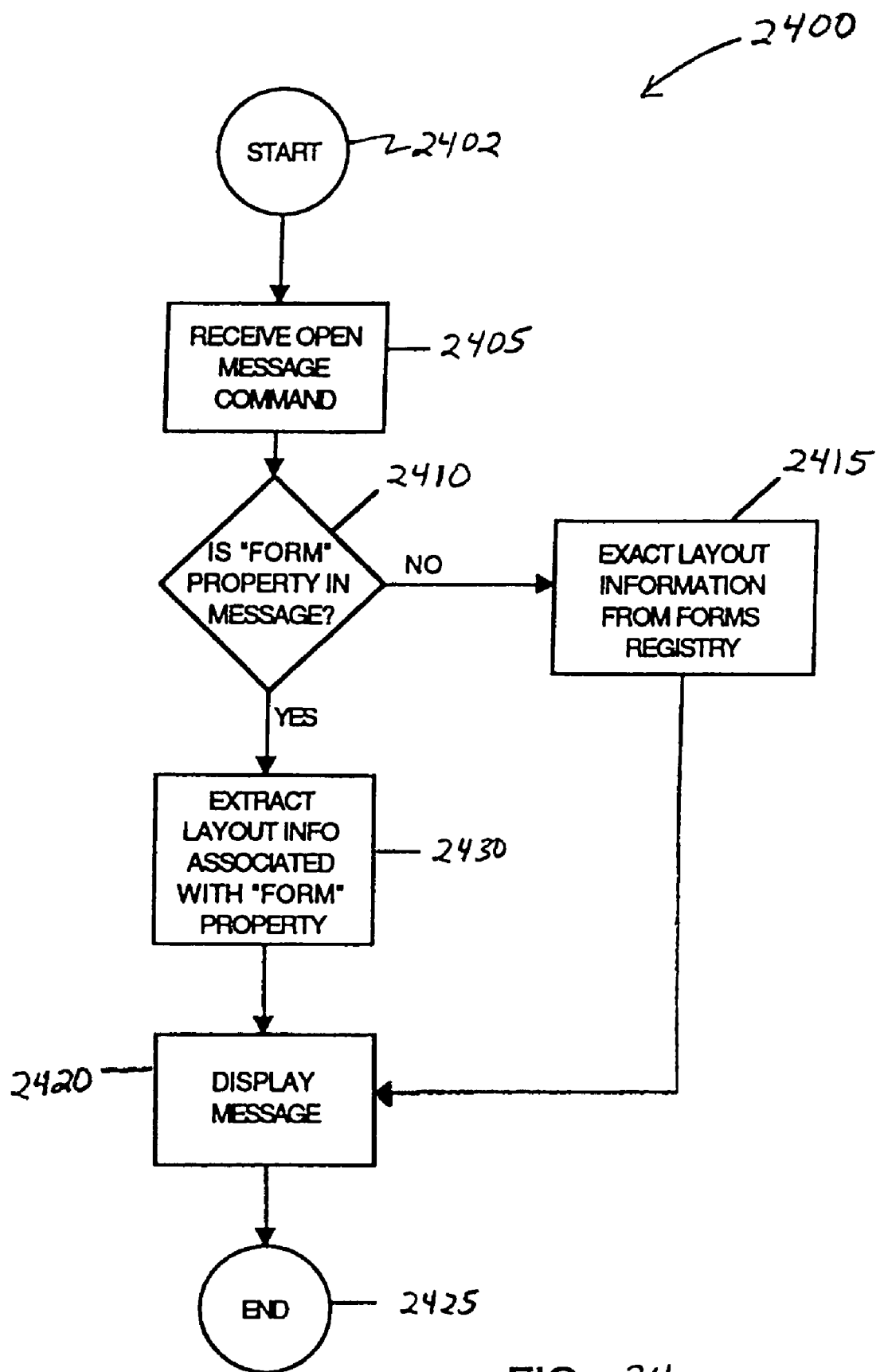
FIG. 24 is a flow diagram illustrating the preferred method for receiving and displaying an e-mail message with a custom form, as performed by the computer.

FIG. 24 is a flow diagram of the steps performed by a recipient's computer in displaying a received message item. The method 2400 begins at start step 2402 and proceeds to step 2405 when the computer receives a command from the user to open a message item in the user's inbox. After the computer receives a command to open a message item, the computer proceeds to step 2410 to determine whether the message item includes a "form" property. If not, the computer proceeds to step 2415 and selects the appropriate form layout information, of form data, from the form registry provider. After extracting the layout information from the form registry provider, the computer combines the data from the message item with the layout information from the form registry provider and displays the message at step 2420. The display of the message includes display of the fields and the field data in the fields. As those skilled in the art will understand, the field data is stored as values in properties in the message item. When displaying a message item, the value in a property is extracted and displayed in the corresponding field. At step 2425, the method ends.

Returning to step 2410, if the computer finds a "form" property in the message item, then the computer proceeds to step 2430. At step 2430, the computer extracts the value, or layout information, stored in the "form" property of the message item. As will be apparent to those skilled in the art, the layout information is the binary data, or value, that is stored in the "form" property. Using this layout information, the computer combines the data from the message item with the display information in the message's "form" property and displays the message item at step 2420. At step 2425, the method ends.

The information that is displayed to the recipient of an e-mail message that uses a custom form, i.e., the "read" page, is preferably the same as the information that is displayed to the designer of the message, i.e., the "compose" page. For example, the e-mail message 2300 in FIG. 23 includes three fields that were added by the sender of the message. The display illustrated in FIG. 23 is the "compose" page. The e-mail message displayed to the recipient, the "read" page, of the message in FIG. 23 preferably has the same information and arrangement as the "compose" page. Thus, a recipient of an e-mail message that uses a custom form does not need to install the custom form before opening the message. In addition, as further described below, the present invention provides a method for responding to an e-mail message that uses a custom form.

Those skilled in the art will appreciate that when a recipient of an e-mail message with a custom form replies to the message, the "form" property and its associated fields are used in the reply message. When composing the reply, the user may alter the data in the fields that constitute the custom form, in which case the new data is stored in the properties associated with those fields. Furthermore, the user may further customize the form by selecting the "design form" option. In this case, data corresponding to the layout of the newly customized form is stored in the e-mail message's form property. When the reply is sent, the transmitted message item includes the form property and properties corresponding to the constituent data. Thus, the process of replying to a message is substantially similar to the process described in conjunction with FIGS. 20 and 22.

Figure 25:
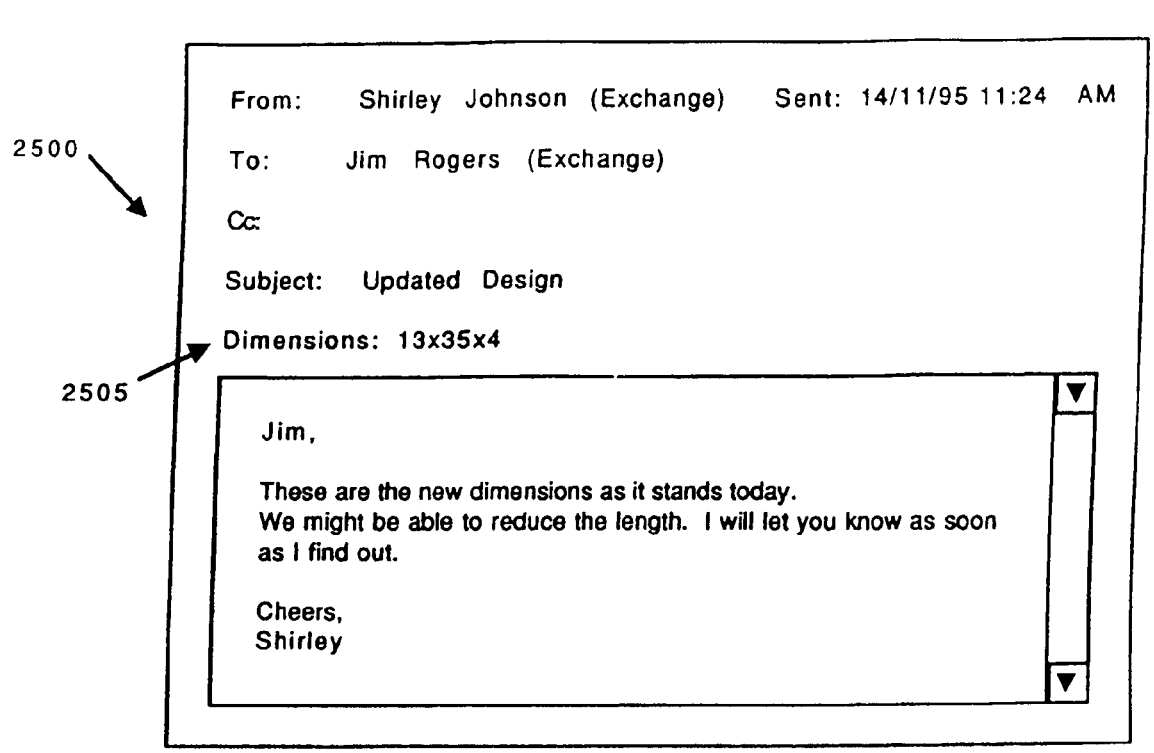
FIG. 25 is a representative example of a screen display of a "read" page that is displayed to the recipient of an e-mail message that uses a custom form.

As mentioned above, the "read" page and "compose" page of a custom form are preferably displayed the same. However, an embodiment of the present invention allows the designer of a custom form to design the "read" and "compose" pages to be displayed differently from one another. For example, the "compose" page in FIG. 23 has explicit fields, a "Length" field 2305, a "Width" field 2310, and a "Height" field 2315. The "read" page of a message using a form with these fields may be designed to be displayed as in FIG. 25. The "read" page of the message 2500 in FIG. 25 displays only a "dimensions" field 2505, which combines the data from the "Length" field, the "Width" field, and the "Height" field. Thus, the designer of a custom form can design the "read" page to display differently than the "compose" page. In addition, the designer of a custom form may also design a form such that certain fields may not be changed in the "read" page.

From the foregoing description, those skilled in the art will appreciate that the present invention facilitates communication between e-mail users by allowing users to create, use and share custom forms spontaneously without requiring publication or installation on other users' computers. This allows small work groups to develop their own tools without requiring company-wide publication of forms.

The Preferred Method for Tallying E-mail Responses

E-mail systems provide an effective means of communicating with a large number of individuals in an organization, such as by sending a single e-mail message to a number of different individuals. Many times, an e-mail message is sent to a number of individuals in order to solicit a response to a particular query. For example, an office administrator may send an e-mail message to all of the employees in an office asking, "Will you attend the office breakfast?" As another example, an e-mail user may send an e-mail message to his or her co-workers listing several restaurants and asking, "At which restaurant would you like the Christmas party held?"

Although prior art e-mail systems make it easy to ask a question of a group of people, the prior art has not provided any convenient or effective way for the sender to organize the responses once they are received. The present invention allows a sender of an e-mail message to create an "autoresponse message" with "voting buttons," which correspond to possible responses to the question addressed in the e-mail message. When each recipient opens the autoresponse message, he sees the question in the body or subject field of the e-mail message and a command bar with voting buttons at the top of the message. To respond, the recipient selects one of the voting buttons in the command bar, edits the reply (if desired), and sends the reply. When the sender's e-mail program receives an autoresponse reply from a recipient, the reply is recognized as an autoresponse reply and the recipient's vote is tallied in the sender's copy of the original message, which is referred to as the "sent mail copy." When the sender opens his or her sent mail copy of the original autoresponse message, he or she is able to view a list that includes the name of each recipient, their response, the time of their response, and a tally of the voting results.

As mentioned earlier, an e-mail message, or e-mail item, includes a plurality of properties. Each property includes a property tag and value which are stored together in system memory 15 (FIG. 1) as a single data structure. In most cases, the properties correspond to a field that is displayed. FIG. 26 illustrates an e-mail message item 2600 that includes a plurality of properties. These include the standard properties, such as a "sender" property 2605, a "recipient(s)" property 2610, a "subject" property 2615, and a "body" property 2620. When an e-mail message is transmitted to the recipient, the property tags and values are transmitted to the recipient via a network.

Message items also typically contain a property or properties used by the e-mail program module to track whether an e-mail item has been sent, received, read, etc. These properties are usually not displayed to the user. An example of such a property is the MAPI property PR_REPORT_TAG. The value stored in a PR_REPORT_TAG property is known as a moniker. The moniker contains data identifying the message store in which the sent mail copy of a message was stored. The moniker also contains data identifying the folder in which the sent mail copy of the message was stored when the original message was sent. The moniker further contains a search key number, which is a unique number that identifies the sent mail copy of the message. Thus, the moniker allows an e-mail program module to locate the sent mail copy of an e-mail message, so that it can be updated when the original message has been sent, received, read, etc.

As illustrated in FIG. 26, the preferred e-mail module uses additional properties to provide the autoresponse feature. The additional properties include a "my vote" property 2625, an "autoresponse verbs" property 2630, a "PR_REPORT_TAG" property 2635, and at least one "voter" property 2640, which correspond to the names of the recipients 2645 of the e-mail message.

The "autoresponse verbs" property 2630 has a value that corresponds to the possible responses, or choices, that can be sent in reply to an autoresponse message query. For example, as shown in FIG. 26, if an autoresponse message includes the query "At which restaurant would you like the Christmas party held?" and the possible choices of restaurants are Chez Jean, Mama Rosa's, and Big Bob's, then the value stored in the "autoresponse verbs" property is "Chez Jean, Mama Rosa's, Big Bob's."

The "my vote" property 2625 is a property with a value corresponding to the vote of the recipient. The value associated with the "my vote" property is empty in the original autoresponse message item. When the recipient enters their vote, an autoresponse verb is executed as will be further described below. One of the actions associated with an autoresponse verb is to store the name of the autoresponse verb as the value of the "my vote" property in the autoresponse reply message.

"Recipient name" properties 2640 corresponding to the name of each recipient 2645 are also used to implement the autoresponse feature. The value of each "voter" property is empty in an autoresponse message item and in an autoresponse reply. Each autoresponse reply message is used to update the sent mail copy of the autoresponse message. The value corresponding to the "my vote" property in the autoresponse reply message is stored in the "voter" property of the sent mail copy of the autoresponse message. For example, when Jim receives an autoresponse message, he selects one of the voting buttons to enter his vote. The data corresponding to Jim's vote is stored as the value in the "my vote" property of Jim's autoresponse reply message. When Jim's autoresponse reply message is received by the e-mail program module of the sender of the original autoresponse message, the sent mail copy of the autoresponse message will be updated to reflect Jim's vote. Specifically, the "voter" property, "Jim," in the sent mail copy of the autoresponse message is updated to reflect the same value as the "my vote" property in the autoresponse reply from Jim.

Having described the additional properties employed by the preferred e-mail module to implement the autoresponse feature, we turn now to the e-mail form used to execute the autoresponse feature. As described above in the section entitled "The Messaging Application Programming Interface (MAPI)," a form is a viewer for a message. Client application developers can create custom forms. These custom forms implement a set of standard menu commands (such as open, create, delete and reply) and a set of commands specific to that particular form.

The commands implemented by a form are also known as verbs. A set of actions, or steps, is performed when a verb is selected by a user of an e-mail program module. As an example, when a user of an e-mail program module selects the reply verb or command, several actions typically occur: (1) the value of the recipient property in the original message is stored as the value of the sender property in the reply message; (2) the value of the sender property in the original message is stored as the value of the recipient property in the reply message; (3) the characters "Re:" are added to the value of the subject property in the original message, and this combined data is stored in the subject property in the reply message, and (4) the value of the body property in the original message is stored as the value of the body property in the reply message.

The preferred e-mail program module uses a custom form and custom verbs to implement the autoresponse feature. The custom form includes custom verbs known as autoresponse verbs. As mentioned above, each autoresponse verb corresponds to a voting button. When a voting button is selected by a recipient of an autoresponse message, the autoresponse verb associated with that voting button is executed. Each autoresponse verb executes the same three actions: (1) an autoresponse reply message item is created; (2) the name of the autoresponse verb that was executed is stored as the value of the "my vote" property of the reply; and (3) the name of the autoresponse verb is stored, along with the value of the "subject" property of the original message, as the value of the "subject" property of the reply.

Having presented a basic overview of properties, forms, and fields, a detailed description of the steps performed by a user to create an autoresponse e-mail message will be presented below.

Figure 27:
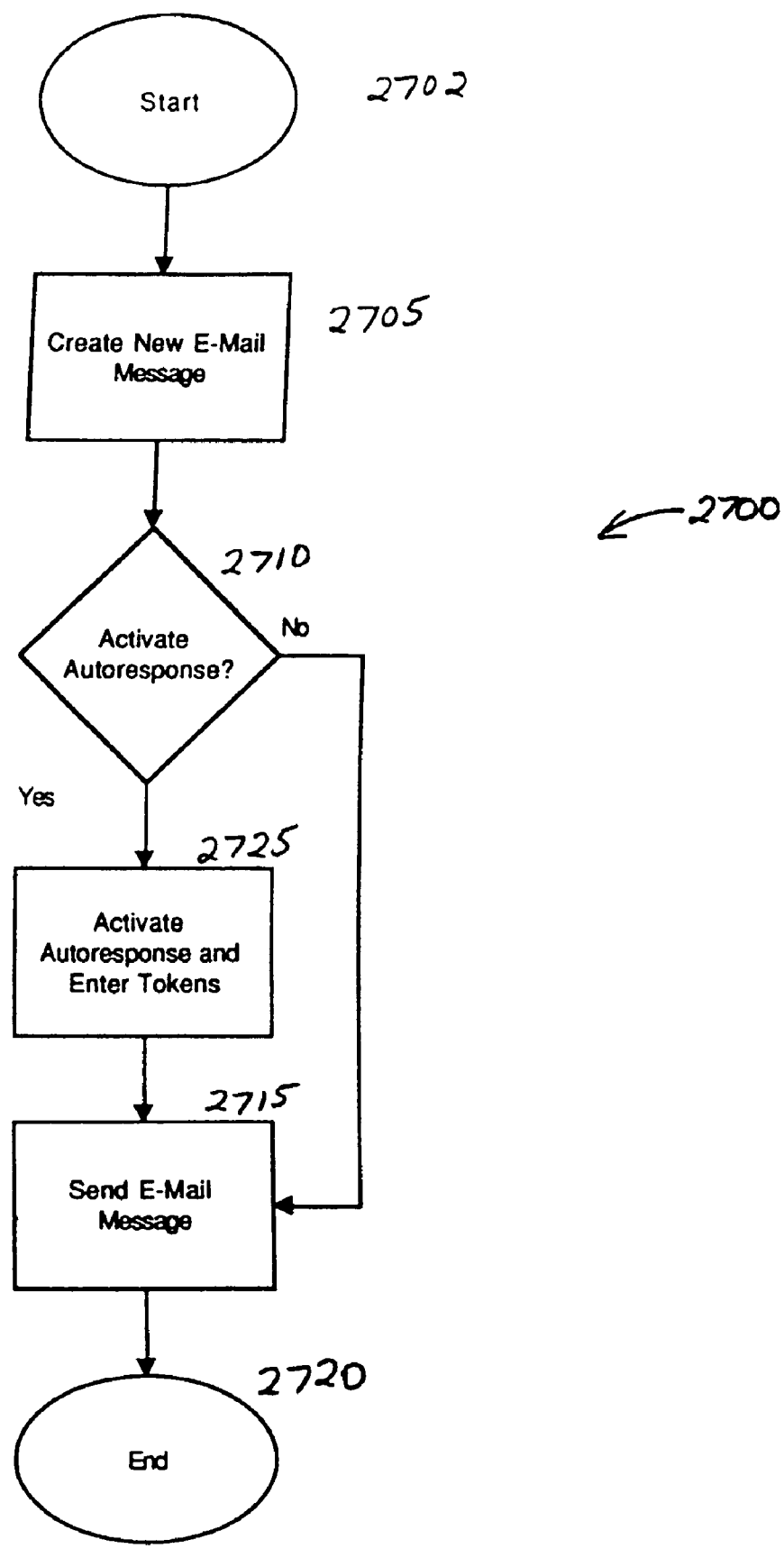
FIG. 27 is a flow diagram illustrating the preferred method for creating and sending an autoresponse message, as performed by a user.

FIG. 27 is a flow diagram that illustrates the steps performed by a user to create an autoresponse e-mail message.

Although the method of creating, sending, and replying to an autoresponse e-mail message is described below in the context of a user executing certain steps and a computer performing certain steps, those skilled in the art will understand that the present invention is a computer-implemented process carried out by a computer in response to both user input and instructions from an e-mail program module.

The method 2700 begins at start step 2702 and proceeds to step 2705 when the user decides to create a new e-mail message. At step 2705, the user performs the steps associated with the creation of a conventional e-mail message, including identifying the recipients of the message, entering a subject, and typing in the text of the message.

At step 2710, the user decides whether to activate the autoresponse feature. If the user decides not to activate autoresponse, then the user proceeds to step 2715 and sends the e-mail message. After the message is sent, the method 2700 ends at step 2720.

If, at step 2710, the user decides to activate autoresponse, the user proceeds to step 2725, activates the autoresponse feature, and enters a set of possible responses to the query presented in the message. Referring now to FIG. 28, activating the autoresponse feature is preferably accomplished by selecting an options page 2805 of the e-mail program module and clicking a "use voting buttons" checkbox 2810. In the preferred e-mail program module, this results in the display of an entry blank 2815 and a drop-down menu 2820. The user then may enter each possible predefined response, separated by a semicolon, into the displayed entry blank. Each possible response entered by the user is known as a token. For example, if the query posed in the e-mail message is "At which restaurant would you like the Christmas party held?," the user might enter the tokens 2825 by typing in the names of several different restaurants, such as Chez Jean; Mama Rosa's; Big Bob's as shown in FIG. 28. As mentioned above, the preferred application program also displays a drop-down menu 2820 when the "use voting buttons" checkbox is selected. The drop-down menu includes pre-defined token sets 2830. The pre-defined token sets are combinations of tokens that are frequently used, such as Approve; Reject, Yes; No, and Yes;No;Maybe. Thus, when a user needs to use one of the pre-defined token sets 2830, the user selects the pre-defined token set in the drop-down menu rather than entering the tokens into the entry blank.

Returning to FIG. 27, after the user enters the tokens at step 2725, the user proceeds to step 2715 and sends the e-mail message. Therefore, to create an autoresponse message, the user creates an e-mail message, activates the autoresponse feature, enters tokens, and sends the autoresponse message. The functions performed by the computer of the sender of an autoresponse message are described below in reference to FIG. 29.

Figure 29:
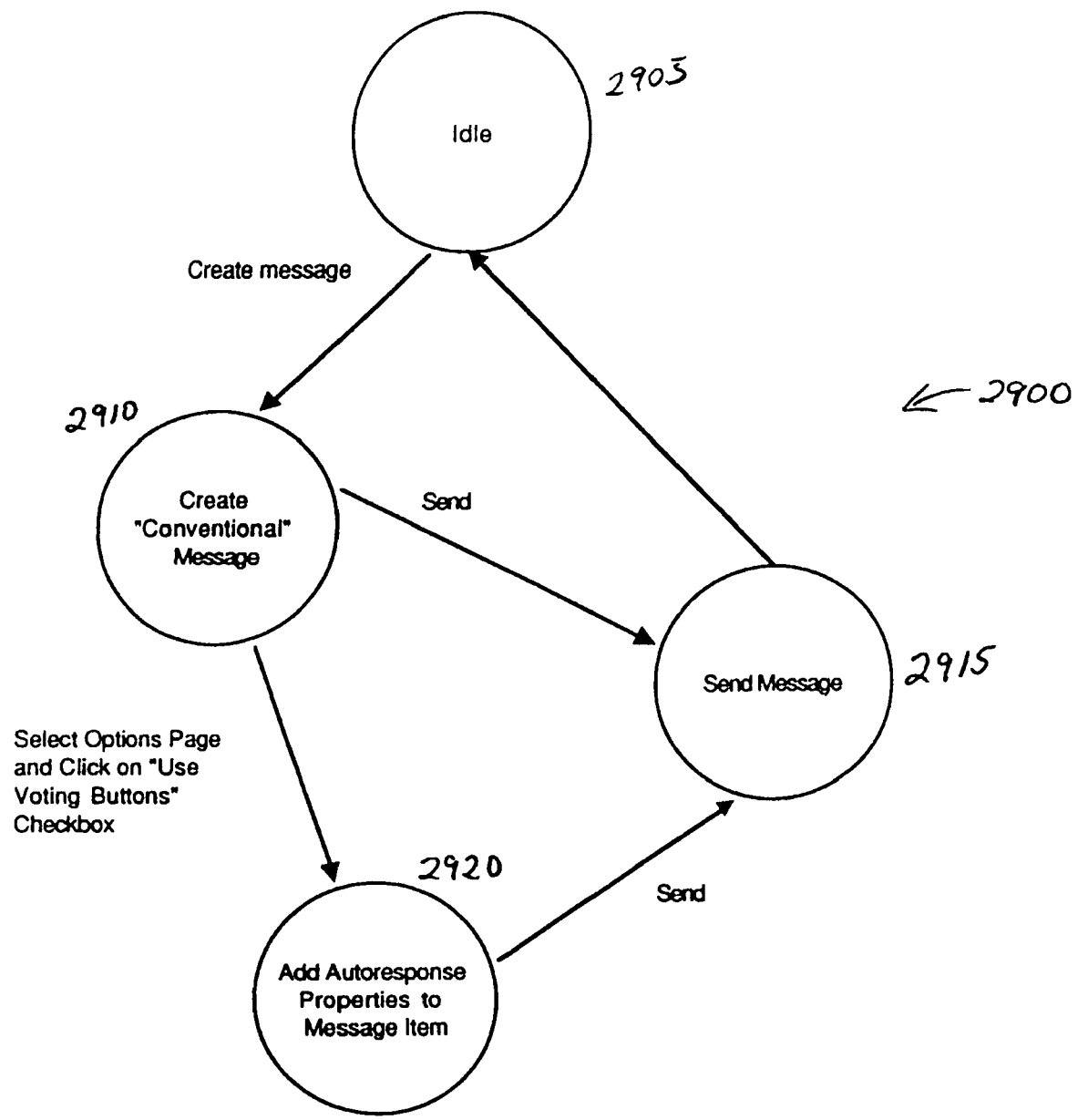
FIG. 29 is a state diagram illustrating the preferred method for creating and sending an autoresponse message, as performed by the computer.

FIG. 29 is a state diagram illustrating the functions performed by a computer that is being used to create an e-mail message that includes the autoresponse feature. The method 2900 begins at state 2905 with the computer in an idle state as it relates to instructions provided by the e-mail program module. When the user selects the command for creating a new message, the computer proceeds to state 2910, where it receives the information that is typically associated with a conventional e-mail message. This includes receiving data indicative of the recipients, subject, priority, and body, and storing this data as values in the corresponding properties that constitute the message item. If the user then selects the "send" command, the computer proceeds to state 2915 and transmits the e-mail message item. After the message is sent, the computer returns to the idle state 2905.

Referring again to state 2910, if the user selects the options page and clicks a "use voting buttons" checkbox, the computer proceeds to state 2920. At state 2920, the computer adds the autoresponse properties to the message item. As mentioned above, the creation of new message properties is facilitated by the MAPI function SetProps. To add the "autoresponse verbs" property, the computer receives a set of tokens entered by the user. The computer creates a custom verb from each token and stores the data indicative of the name of each verb as the value of the "autoresponse verbs" property.

At state 2920, the computer also adds a "my vote" property and "voter" properties corresponding to the names of each of the recipients to the message item. The "my vote" property and the "voter" properties do not have any data stored as their value when they are added to the autoresponse message. At state 2920, the computer also stores a moniker in the PR_REPORT_TAG property.

When the user selects the "send" command, the computer proceeds to state 2915 and transmits the autoresponse message item. The computer also stores a sent mail copy of the autoresponse message. The sent mail copy is preferably stored in the sender's sent mail folder, but the sent mail copy may be stored in another memory storage location specified by the sender. The sent mail copy of the autoresponse message will be updated when recipients reply to the autoresponse message. This updating will be described below in reference to FIG. 34.

Figure 30:
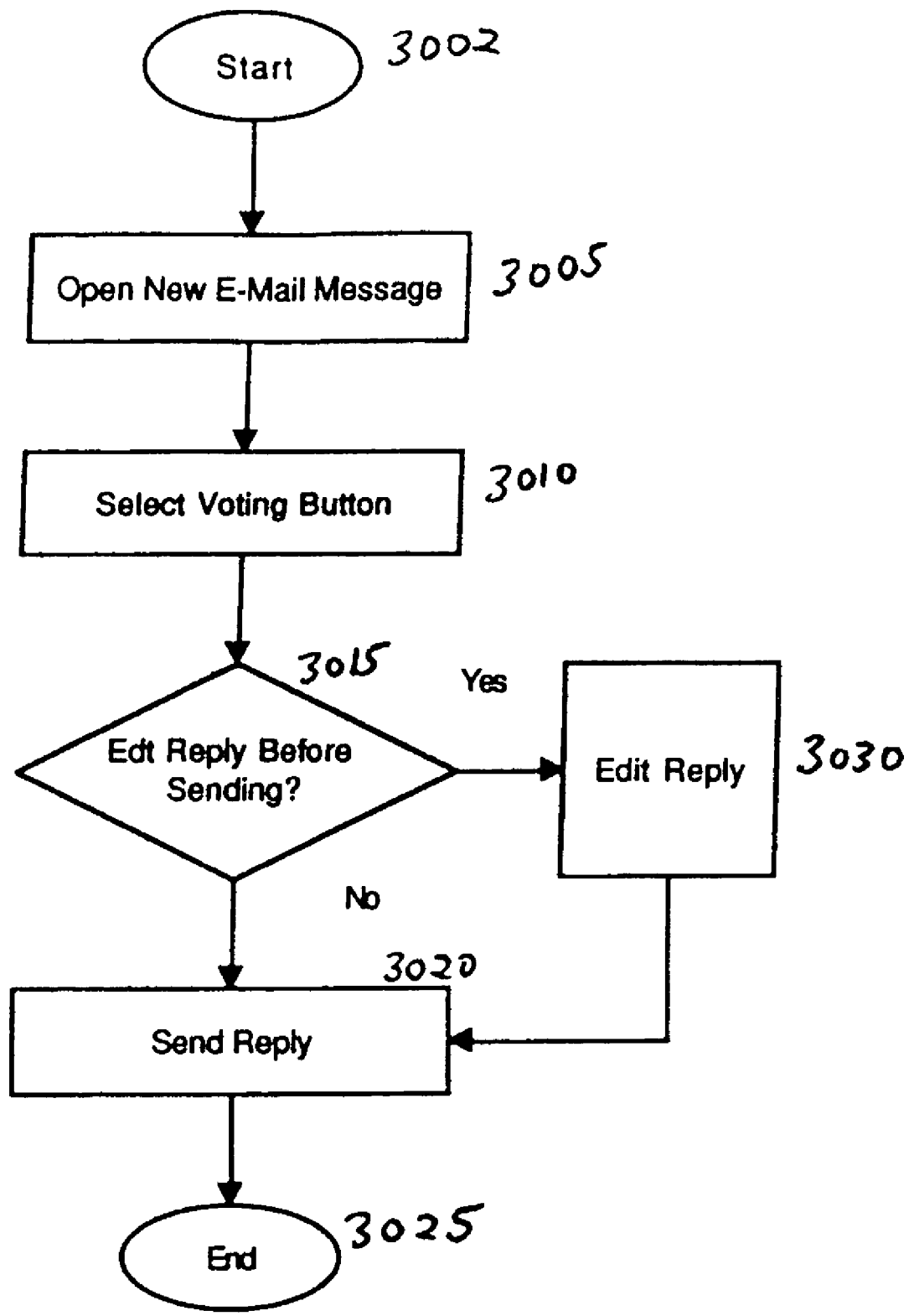
FIG. 30 is a flow diagram of the steps performed in replying to an autoresponse message, as performed by a user.
Figure 31:
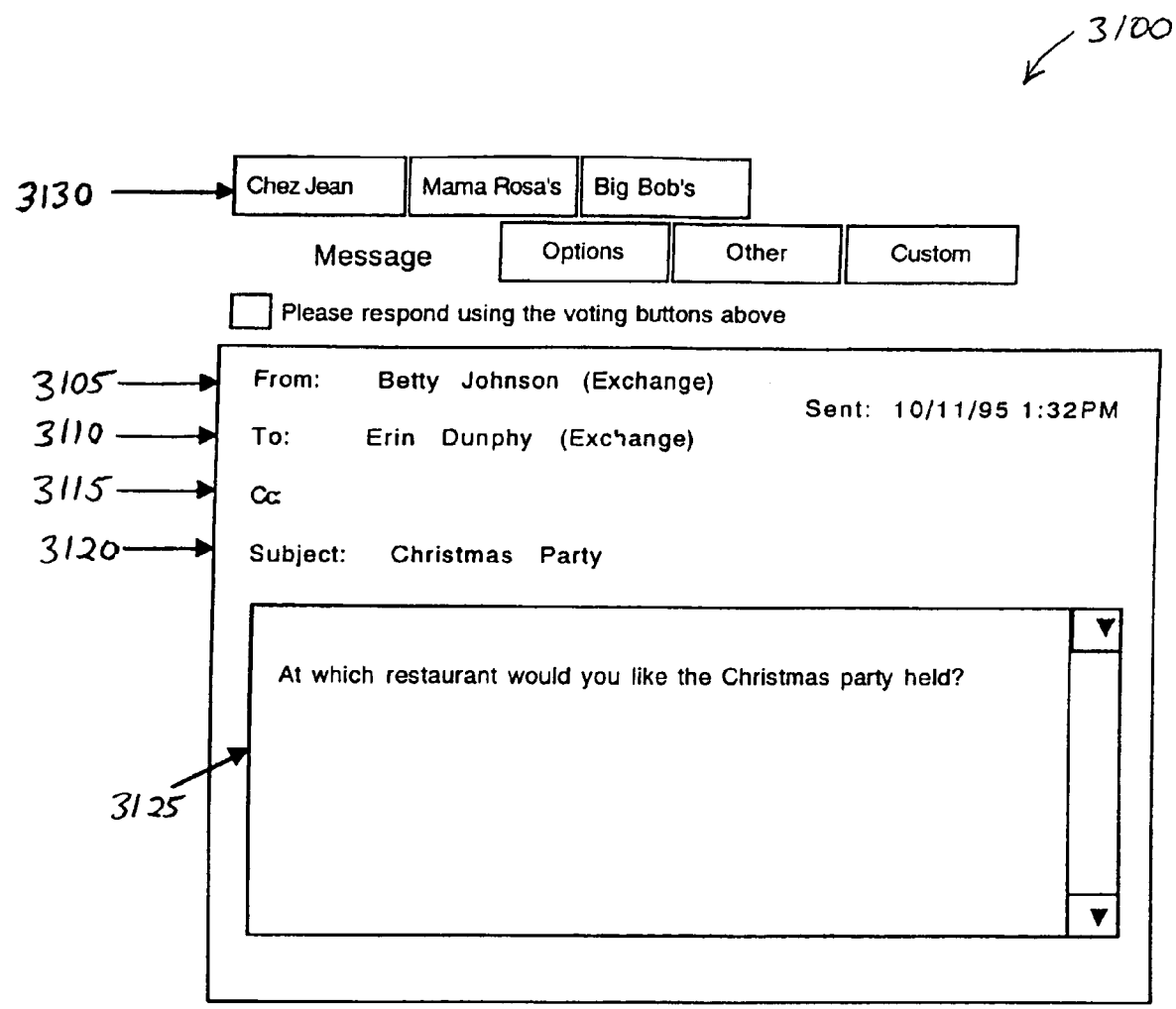
FIG. 31 is a representative example of a screen display of a recipient's view of an autoresponse message.

Turning now to the process of receiving an autoresponse message, FIG. 30 is a flow diagram that illustrates the steps that may be performed by a recipient of an autoresponse message. The method 3000 begins at start step 3002 and proceeds to step 3005 when the user opens an e-mail message item with the autoresponse feature. After opening the message, the user may read the text of the message, including the query presented by the sender of the autoresponse message. For example, in the preferred application program, the user, after opening an autoresponse message, views a message 3100 such as is shown in FIG. 31. The autoresponse message is similar to a conventional e-mail message and includes a "from" field 3105, an address field 3110, a "Cc" field 3115, a "subject" field 3120, and a "body" field 3125. The autoresponse message also includes the voting buttons 3130.

Referring again to FIG. 30, after the user has opened and viewed the message at step 3005, the user selects one of the voting buttons at step 3010. When the user selects one of the voting buttons, an alert box message will appear that will warn the user that their reply will now be sent. The alert box message asks the user if he would like to edit the reply before sending the reply message. At step 3015, the user decides whether to edit his reply before sending the message. If the user decides not to edit his reply, then the user clicks the "send" button at step 3020. The method ends at step 3025.

Returning to step 3015, if the user decides to edit his response, then the user enters data into the body field of the autoresponse reply at step 3030. When the user decides to send the autoresponse reply message, the user proceeds to step 3020 and sends the message. The method ends at step 3025.

Therefore, a recipient of an autoresponse message needs only to execute a few simple steps to reply to an autoresponse message. The recipient opens the autoresponse message, reads the query presented in the message, selects a voting button, edits the reply (if necessary), and sends the autoresponse reply to the sender. The functions performed by a computer of a recipient who is replying to an autoresponse message are described below.

Figure 32:
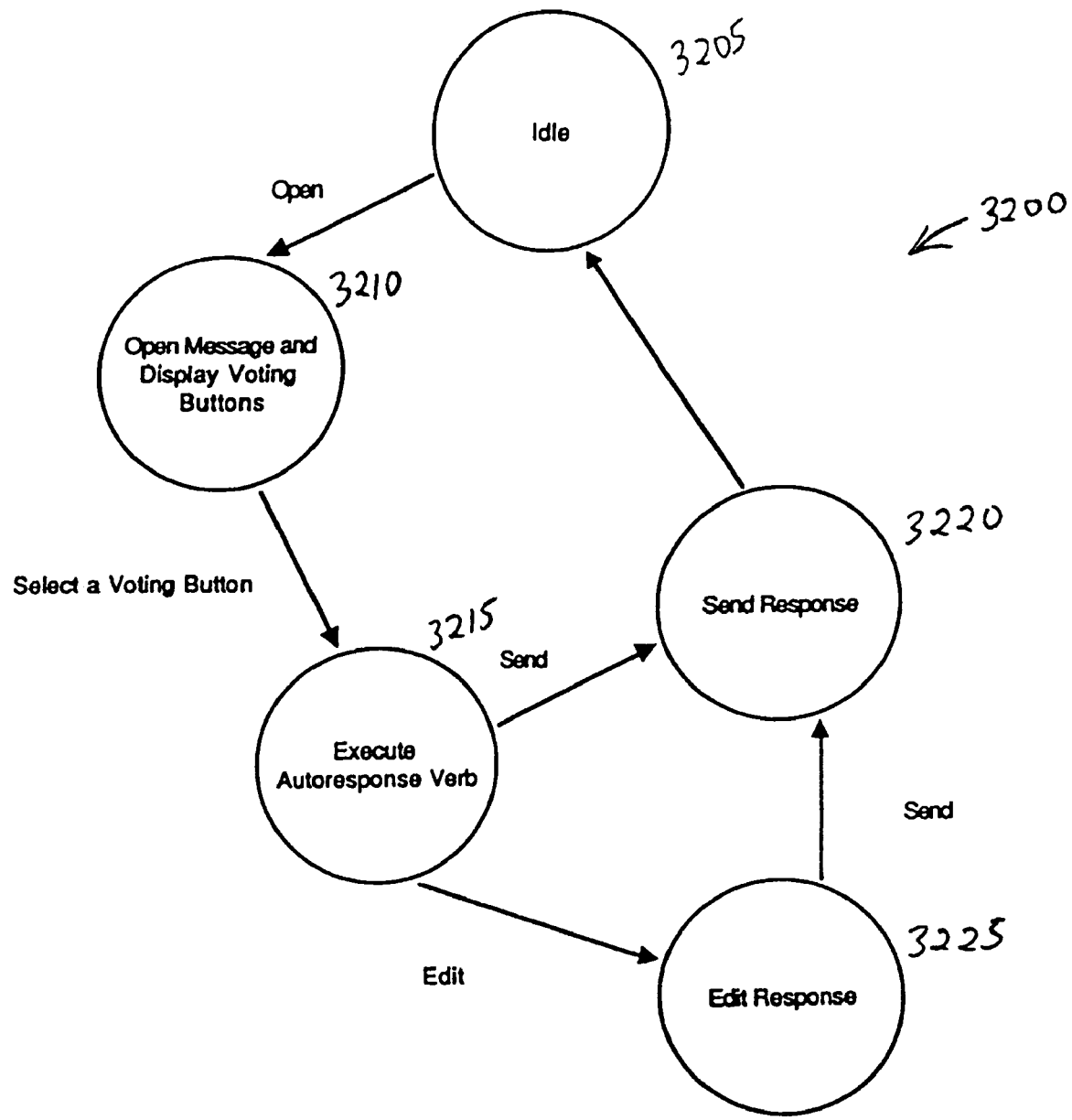
FIG. 32 is a state diagram illustrating the preferred method for opening an autoresponse message and sending a reply to an autoresponse message, as performed by the computer.

FIG. 32 is a state diagram illustrating the functions performed by a computer that is being used to open and reply to an autoresponse e-mail message. The method 3200 begins at step 3205 with the computer in an idle state as it relates to instructions provided by the e-mail program module. If the user invokes an "open message" command, the computer goes to state 3210 and opens the selected autoresponse message. The computer searches the message item to locate the "autoresponse verbs" property. As described above, the responses, or tokens, entered by the sender of the message are used to create "autoresponse verbs." The data indicative of the names of these autoresponse verbs are stored is stored as a value in a property called autoresponse verbs. The computer reads the value of the "autoresponse verbs" property and displays voting buttons corresponding to each autoresponse verb.

If the user selects a voting button, then the computer proceeds to state 3215. At state 3215, the computer executes the "autoresponse verb" corresponding to the voting button. As described above, when an autoresponse verb is executed, the computer stores the data corresponding to the name of the autoresponse verb chosen by the recipient as the value in the "subject" property of the reply message. The computer also stores the data corresponding to the name of the autoresponse verb selected by the recipient as the value in the "my vote" property of the reply message. Also, the PR_REPORT_TAG property associated with the original message is copied by the computer into the reply message.

Returning to state 3215, if the user decides to send the autoresponse reply message without editing, then the computer proceeds to state 3220 and transmits the autoresponse reply. The computer then returns to the idle state 3205.

If the user does decide to edit the reply message, then the computer proceeds to state 3225. At state 3225, the computer receives data indicative of changes to the fields of the message and stores this data as the value of the corresponding property in the message item. When the user sends the message, the computer proceeds to state 3220 and transmits the message.

Figure 33:
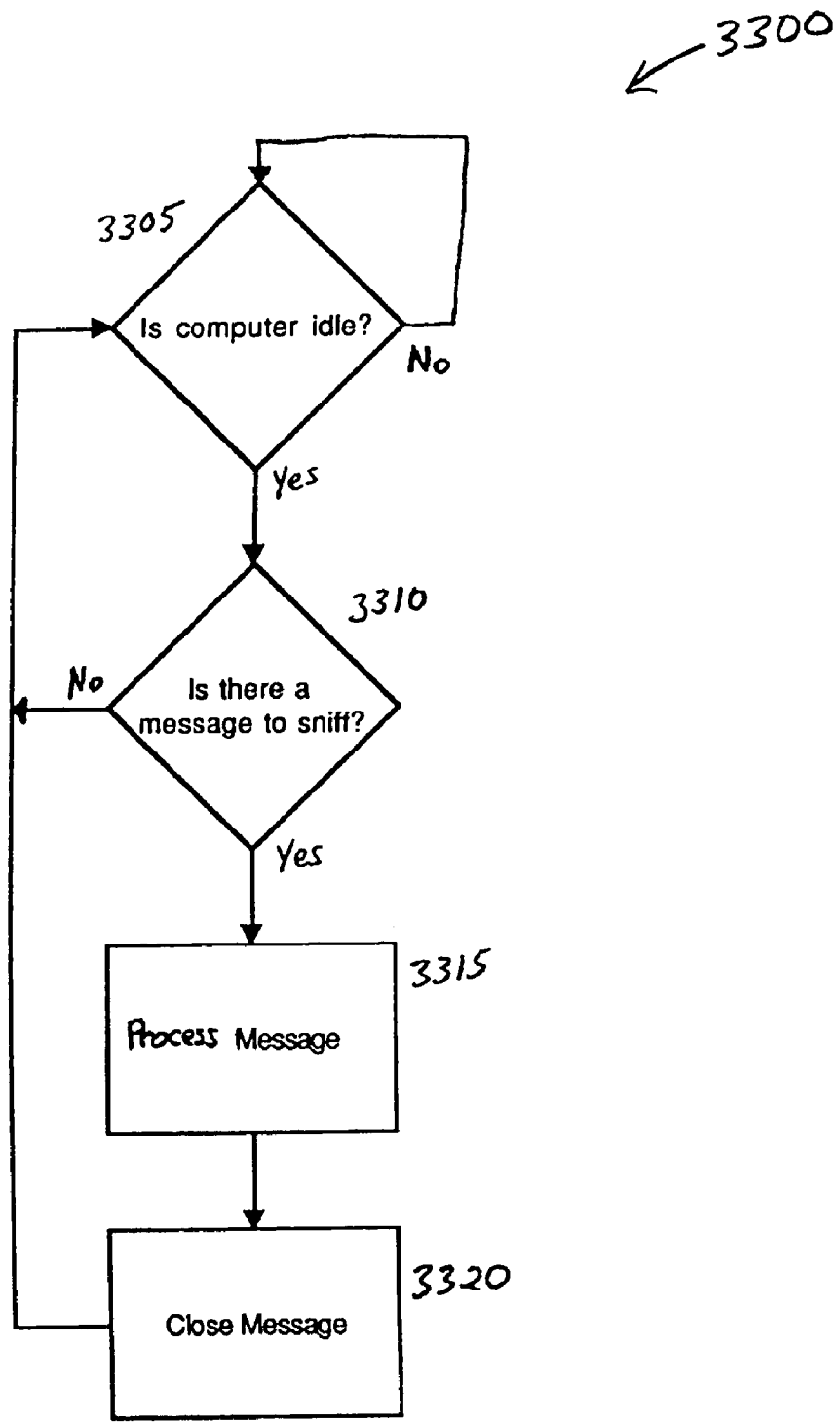
FIG. 33 is a flow diagram illustrating the steps carried out in the background to process an autoresponse reply message.

When an autoresponse reply is sent back to the original sender of the autoresponse message, the reply is processed, i.e., the voting results are updated, when the reply message is opened for the first time. The reply may be opened in a conventional manner by the user selecting an open command for the autoresponse reply. The autoresponse reply may also be processed in the background, i.e., without any input from the user, by an automatic processor known as a sniffer. The sniffer ensures that autoresponse replies are processed in a timely manner even if the user never opens the replies. FIG. 33 is a flow diagram illustrating the functions performed by the sniffer when an autoresponse reply is received. The method 3300 begins at step 3305. The sniffer determines at step 3305 whether the computer is idle. If the computer is idle, the sniffer proceeds to step 3310 to determine whether there is a message to sniff. This is preferably done by searching a "sniff state" property that is associated with unread messages. The "sniff state" property can have three values: "none," "on sniff," or "on open only." If the "sniff state" property is "on stiff," then the message is processed by the sniffer. If the "sniff state" property is "none" or "on open only," the sniffer returns to step 3305 to determine whether the computer is still idle.

Returning to step 3310, if the sniffer finds a message with a value of "on sniff" in its "sniff state" property, the sniffer proceeds to step 3315 and processes the autoresponse response message item. After processing the autoresponse response message item at step 3315, the sniffer closes the autoresponse response message item at step 3320. The sniffer then proceeds to step 3305 to determine whether the computer is still idle.

Thus, those skilled in the art will recognize that the sniffer will process an autoresponse reply message item even if the original sender never opens the reply. In addition, an autoresponse reply message item will be processed even if the user deletes the message item before the sniffer is able to process the message item. When a user deletes the autoresponse reply message item, the original message will be updated to reflect the content of the reply before the message item is deleted. Because of these features, the user does not have to open each and every response to tally results. Instead, the user may simply open the "sent mail" copy of the autoresponse message to view the voting results.

Figure 34:
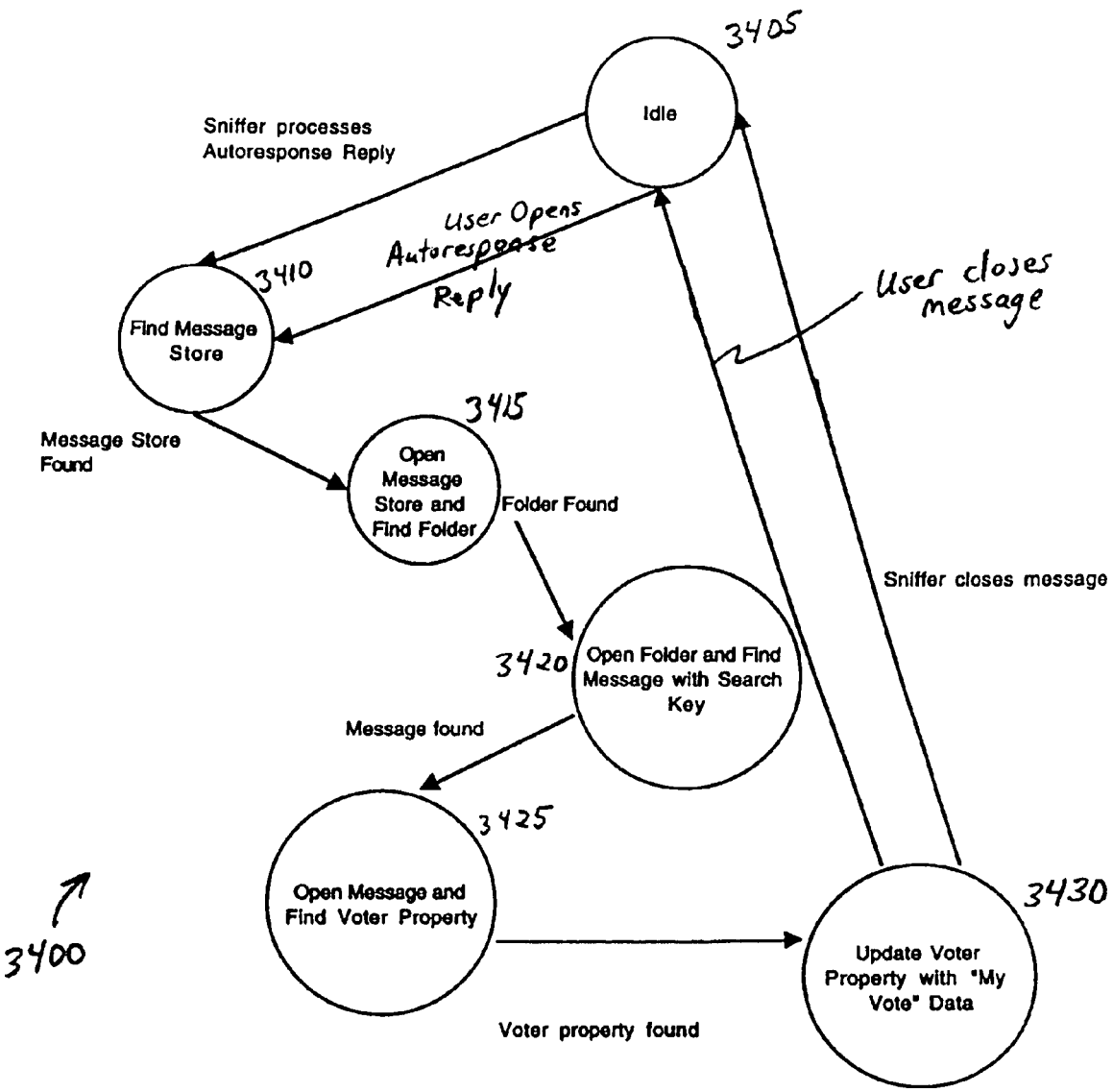
FIG. 34 is a state diagram illustrating the preferred method for updating the sent mail copy of an autoresponse message, as performed by the computer.

FIG. 34 is a state diagram illustrating the functions performed by a computer that is being used to update the sent mail copy of an autoresponse message. The method 3400 begins at step 3405 with the computer in an idle state as it relates to instructions provided by the e-mail program module. When the user selects the command to open an autoresponse response item or the sniffer opens an autoresponse response item, the computer proceeds to state 3410. The computer reads the value of the PR_REPORT_TAG property of the autoresponse response in state 3410. The value of the PR_REPORT_TAG is known as a moniker. The moniker contains information used to locate the original autoresponse message on the sender's computer. The original autoresponse message must be found to update the original message with the votes of the recipients. Specifically, the moniker contains data corresponding to the message store that the original message was stored in, the folder that the original message was stored in, and a search key. Returning to step 3410, the computer reads the moniker and searches the computer's memory storage devices for a message store that corresponds to the message store identified in the moniker.

Once the computer finds the proper message store, the computer proceeds to step 3415. At step 3415, the computer searches the message store for a folder that corresponds to the folder identified in the moniker. After the proper folder is found, the computer proceeds to step 3420. At step 3420, the computer opens the folder and searches for a message with a search key corresponding to the search key identified in the moniker. The message with the corresponding search key is the original autoresponse message. After the original autoresponse message is found, the computer proceeds to step 3425. It will be appreciated that, at any point in the process of finding the original message, the process could terminate if the proper message store, proper folder, or proper message is not found.

At step 3425, the computer opens the original autoresponse message and searches for a "voter" property corresponding to the value of the "sender" property of the autoresponse reply. For example, if Bob receives an original autoresponse message and responds by selecting a voting button, then the autoresponse reply from Bob will contain data indicative of "Bob" in the "sender" property. When the autoresponse reply is opened, the computer finds the original autoresponse message as described above in reference to states 3410-3420. The computer then opens the original autoresponse message and searches for the "voter" property corresponding to "Bob."

After the "voter" property is found at state 3425, the computer proceeds to step 3430. The computer updates the value of the "voter" property with the value of the "my vote" property of the autoresponse reply. After the sniffer or the user closes the autoresponse reply, then the computer returns to idle state 3405.

When a sender of an autoresponse message wants to view the replies to his or her message, the sender may view each individual reply to the autoresponse message. For example, FIG. 35 illustrates the inbox 3500 of a e-mail program module in a list view. Message 3505 and message 3510 are autoresponse reply messages. The name of the autoresponse verb 3515 chosen by the recipient 3520 of the autoresponse message is listed under the subject heading of the inbox before the original subject of the autoresponse message. It will be understood that including the recipient's "vote" in the subject of the message provides a distinct advantage over the prior art. The user does not need to open the response in order to read the vote of the recipient because it is already listed in the subject heading. Furthermore, it will be apparent that the sender of the autoresponse message can open the individual reply messages and read the vote of the recipient and any comments the recipients may have edited into their reply. However, because of the sniffer, the sender of an autoresponse message does not have to open each individual reply message to tally the results since the sniffer will process the replies in the background.

In addition to viewing the inbox, the sender of an autoresponse message can open his or her sent mail copy of the autoresponse message. When the sender opens the sent mail copy of the autoresponse message, he views a list of the recipients 3605, their responses 3610, the time 3615 each response was received, and a current tally 3620 of the vote results such as is illustrated in FIG. 36.

As known to those skilled in the art, the current tally for each vote is found by computing the number of recipients that have responded with that vote.

In another embodiment, when the sender opens a reply to the autoresponse message, the computer displays a list of the results such as is shown in FIG. 36. Thus, in this embodiment, the sender can view the results by opening any reply message rather than locating and opening the sent mail copy of the autoresponse message.

From the foregoing description, those skilled in the art will appreciate that autoresponse messages facilitate communication between the sender of an e-mail message containing a query and the recipients of the e-mail query. This is accomplished by allowing the sender of the e-mail message to add voting buttons that correspond to the possible responses to the e-mail query. To reply, each recipient simply selects a voting button and sends their reply. When the replies are received at the sender's e-mail program module, the votes are automatically tallied by a background process, known as a sniffer, or when the sender opens a reply. However, because of the automatic processing of the sniffer, the sender does not have to open every e-mail reply to see the voting results. Instead, the sender simply opens a sent mail copy of the e-mail query to view the voting results. When the sent mail copy is opened, the sender may view a list of the recipients, their response, the time their response was received, and a current tally of the voting results.

Summary of the Detailed Description

From the foregoing description, it will be appreciated that the present invention provides an improved system and method for processing and organizing e-mail message items.

The preferred system and method are embodied in an e-mail module that forms a part of a personal information manager program. In summary, recipient names are resolved in the background while the user composes the remainder of the message. Unambiguous names are resolved without further intervention by the user. The user resolves ambiguous names by selecting from a list of possible matches displayed in a context menu. The e-mail module remembers how ambiguous names are resolved and automatically creates nicknames for future use. In addition to a subject and body, each e-mail message may contain a message flag, which specifically identifies follow-up actions that need to be performed and deadlines for those actions. The message flag and due date are stored in message properties and may be edited by either the sender or the recipient. The message flags allow a recipient to quickly determine which messages have action items associated with them, when they are due, and whether they have been completed. Another aspect of the present invention allows users to create and share custom e-mail forms. The attributes of the custom form are stored in an e-mail property, along with the data that will be displayed in the custom form. Finally, another aspect of the present invention allows E-mail users to solicit input from a group of recipients by providing predetermined choices for their response. Each recipient replies to the original query by selecting a response. When the sender receives the replies, the response is automatically tallied and easily available to the sender.

The foregoing system may conveniently be implemented in a program module or program that is based upon the flow charts and state diagrams in FIGS. 9, 10, 13, 16, 17 18, 22, 24, 29, 32, 33 and 34. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In an electronic mail system for transmitting an item, the item including a plurality of properties, a computer-implemented method for transmitting custom form data as part of the item, comprising:
   obtaining the custom form data, the custom form data including at least one field for displaying field data stored in at least one of the plurality of properties and control data values for controlling the layout of the at least one field upon application of the control data values to a general form generation procedure of a recipient computer without requiring a custom form stored on the recipient computer prior to the application of the control data values; and
   storing the custom form data in one of the plurality of properties in response to obtaining the custom form data.

2. The method of claim 1, further comprising:
   receiving the field data from the fields as input; and
   storing the field data in the at least one of the plurality of properties.

3. The method of claim 1, wherein obtaining the custom form data comprises the steps of:
   displaying a form;
   altering the form in response to input; and
   creating the custom form data corresponding to the altered form.

4. In an electronic mail system for receiving an item, a method for displaying an item comprising:
   receiving the item at a receiving computer, the item including a plurality of properties;
   determining whether the item includes a form property for a custom form, wherein the custom form is not stored on the receiving computer;
   in response to a determination that the message item includes the form property, retrieving form data stored in the form property; and
   otherwise, retrieving form data from a form registry.

5. The method of claim 4, wherein the form registry comprises data stored on a memory storage device, the data corresponding to a description of at least one form.

6. The method of claim 4, wherein the form property comprises data corresponding to a description of the form.

7. A computer storage medium on which is stored a computer program for transmitting custom form data as part of an item, the computer program comprising instructions which, when executed by a computer, perform the steps of:
   adding a form property to the item;
   obtaining the custom form data, the custom form data including at least one field for displaying field data stored in at least one of a plurality of properties and control data values for controlling the layout of the at least one field upon application of the control data values to a general form generation procedure of a recipient computer without requiring a custom form stored on the recipient computer prior to the application of the control data values;
   storing the custom form data in the form property in response to obtaining the custom form data;
   receiving the field data from the at least one field as input; and
   storing the field data in the at least one of the plurality of properties.

8. The computer storage medium recited in claim 7, wherein the step of obtaining the custom form data comprises the steps of:
   displaying a form;
   altering the form in response to input; and
   creating the custom form data corresponding to the altered form.

9. A computer storage medium on which is stored a computer program for displaying an item in the context of a form, the computer program comprising instruction which, when executed by a computer, perform the steps of:
   receiving the item at a receiving computer, the item including a plurality of properties;
   determining whether the item includes a form property that includes custom form data for a custom form, wherein the custom form is not stored on the receiving computer;
   in response to a determination that the item includes the form property, retrieving the custom form data stored in the form property; and
   otherwise, retrieving form data from a form registry.

10. The computer storage medium of claim 9, wherein the form registry comprises data stored on a memory storage device, the data corresponding to a description of at least one form.

11. The computer storage medium of claim 9, wherein the form property comprises data corresponding to a description of the form.

12. The computer storage medium of claim 9, wherein a compose page and a read page of the form are displayed the same.

13. The computer storage medium of claim 9, wherein a compose page and a read page of the form are displayed differently.

* * * * *